United States Patent [19]
Blanton et al.

[11] Patent Number: 4,752,836
[45] Date of Patent: Jun. 21, 1988

[54] METHOD AND APPARATUS FOR REPRODUCING VIDEO IMAGES TO SIMULATE MOVEMENT WITHIN A MULTI-DIMENSIONAL SPACE

[75] Inventors: Keith A. Blanton, Alpharetta; William M. Finlay, Tucker; Michael J. Sinclair, Lilburn; John E. Tumblin, Decatur, all of Ga.

[73] Assignee: Ivex Corporation, Norcross, Ga.

[21] Appl. No.: 648,725

[22] Filed: Sep. 7, 1984

[51] Int. Cl.⁴ .......................... H04N 5/85; H04N 5/93
[52] U.S. Cl. .................................... 358/342; 358/104; 364/522
[58] Field of Search ............... 358/335, 342, 310, 104; 360/33.1; 364/521, 410, 522; 340/728, 731, 747

[56] References Cited

U.S. PATENT DOCUMENTS

| | | |
|---|---|---|
| 3,641,260 | 2/1972 | Herndon . |
| 3,697,678 | 10/1972 | Belleson . |
| 3,742,289 | 6/1973 | Koeijmans . |
| 3,792,442 | 2/1974 | Koeijmans . |
| 3,829,622 | 8/1974 | Elliott . |
| 3,914,541 | 10/1975 | Elliott . |
| 3,944,727 | 3/1976 | Elliott . |
| 3,959,582 | 5/1976 | Law et al. . |
| 4,163,249 | 7/1979 | Michael et al. ...................... 358/180 |
| 4,172,264 | 10/1979 | Taylor et al. ........................ 358/185 |
| 4,179,823 | 12/1979 | Sullivan et al. . |
| 4,198,656 | 4/1980 | Mathisen . |
| 4,208,719 | 6/1980 | Lotz et al. . |
| 4,208,810 | 6/1980 | Rohner et al. . |
| 4,225,873 | 9/1980 | Winslow . |
| 4,232,456 | 11/1980 | Harmon et al. . |
| 4,282,598 | 8/1981 | Elliott . |
| 4,305,131 | 12/1981 | Best ..................................... 358/342 |
| 4,321,635 | 3/1982 | Tsuyuguchi . |
| 4,333,152 | 6/1980 | Best . |
| 4,343,037 | 8/1982 | Bolton . |
| 4,359,223 | 11/1982 | Baer et al. . |
| 4,359,705 | 11/1982 | Bohn et al. . |
| 4,360,876 | 11/1982 | Girault et al. ...................... 364/521 |
| 4,371,343 | 2/1983 | Paris et al. . |
| 4,375,091 | 2/1983 | Dakin et al. . |
| 4,383,279 | 5/1983 | Kenny, II . |
| 4,387,406 | 10/1980 | Ott . |
| 4,395,740 | 7/1983 | Yuen et al. . |
| 4,449,198 | 5/1984 | Kroon et al. . |
| 4,451,913 | 5/1984 | Elliott . |
| 4,475,132 | 10/1984 | Rodesch ............................. 358/342 |
| 4,533,910 | 8/1985 | Sukonick et al. .................... 364/521 |
| 4,558,438 | 12/1985 | Jones et al. .......................... 340/747 |
| 4,571,684 | 2/1986 | Takanabe et al. ................... 364/521 |
| 4,580,782 | 4/1986 | Ochi ..................................... 364/521 |
| 4,583,185 | 4/1986 | Heartz . |
| 4,615,013 | 9/1986 | Yan et al. . |

OTHER PUBLICATIONS

Devarajan, Venkat Dr., "Low Altitude High Speed Flight Simulation Using Video Disc Technology".

Hashimoto, Yoshitaka, "Digital Decoding and Encoding of the NTSC Signal at 912 Samples per Line", *SMPTE Journal*, Oct. 1981.

Lineback, J. Robert, "Flight Simulater Market Soars", *Electronics*, Oct. 6, 1981.

Perry, Tekla S., "Video Games: The Next Wave", *IEEE Spectrum*, Dec. 1983.

West, Susan, "The New Realism",*Science*, Jul./Aug., 1984.

Tucker, Jonathan B., "Computer Graphics Achieves New Realism", *High Technology*, Jun., 1984.

Bergheim, et al., "Lasers Enhance Mass Storage", *InfoWorld*, Jun. 25, 1984.

*Primary Examiner*—Donald McElheny, Jr.
*Attorney, Agent, or Firm*—Jones, Askew & Lunsford

[57] ABSTRACT

A method and apparatus for simulating movement within a multi-dimensional space by selecting and reproducing a particular one of a plurality of selectable sequences of video images subsequent to a given sequence of video images. The apparatus comprises an interactive random access video disc system for storing the sequences of video images. Video image windowing means provides as a video output only a predetermined "window" portion of each retrieved video image. The window portion of an ending image of a given retrieved sequence substantially duplicates the window portion of a starting image of a retrieved sequence reproduced immediately subsequent to the given sequence, thereby providing a relatively imperceptible transition between sequences. A method for numbering frames on the video disc ensures that a jump between images in any sequence or to an image in a subsequent sequence can be accomplished within a predetermined number of tracks and within a predetermined time, in order to prevent pauses or blankings of the output video images.

43 Claims, 19 Drawing Sheets

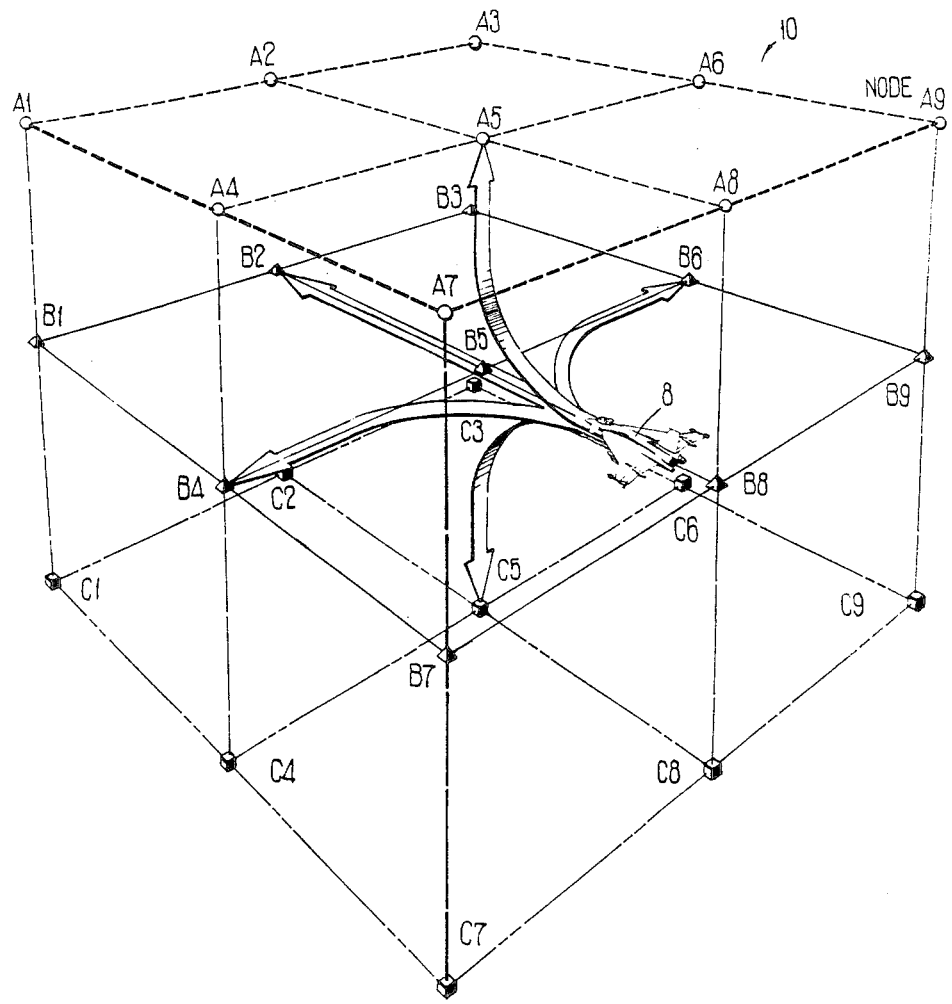
FIG A

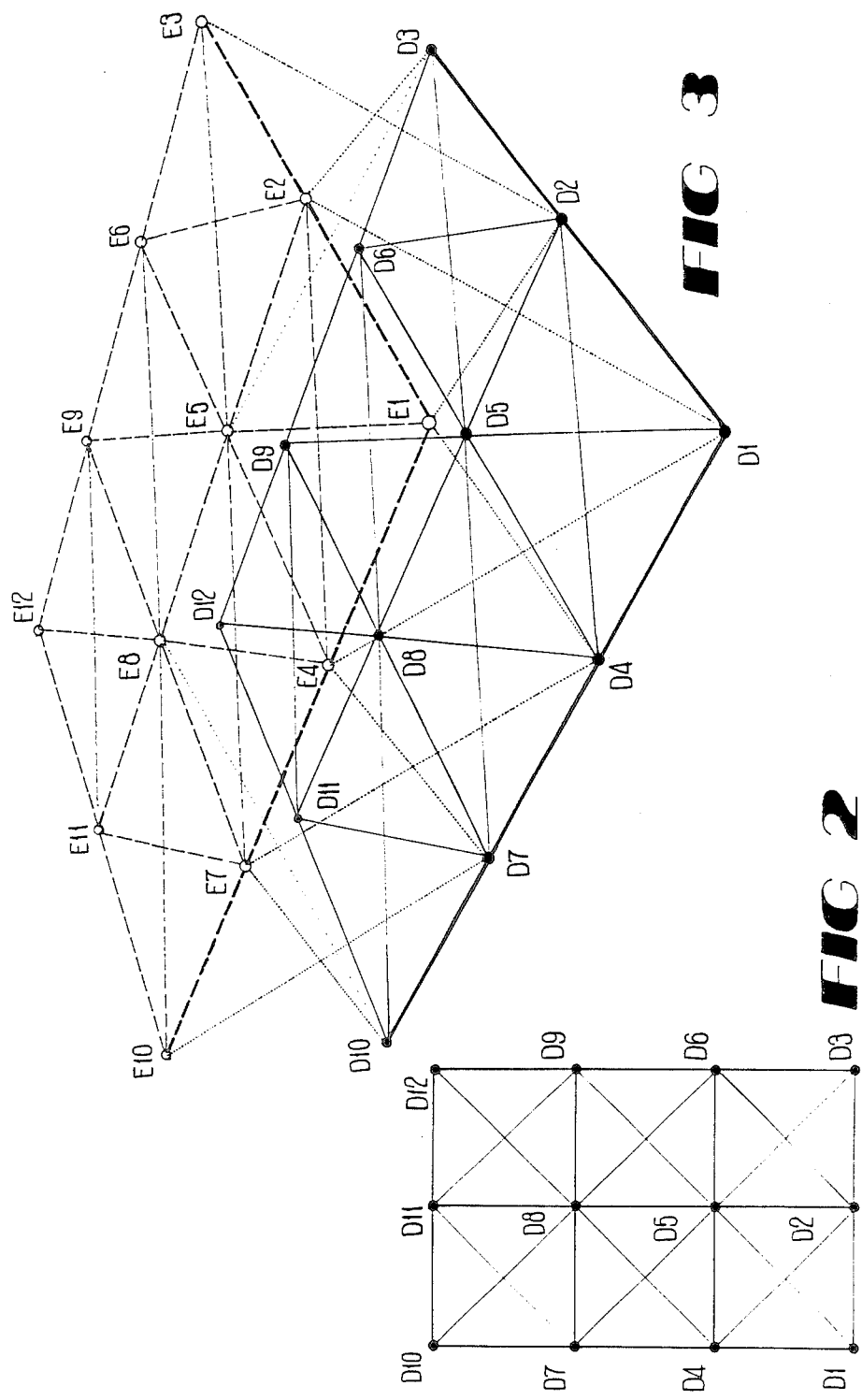

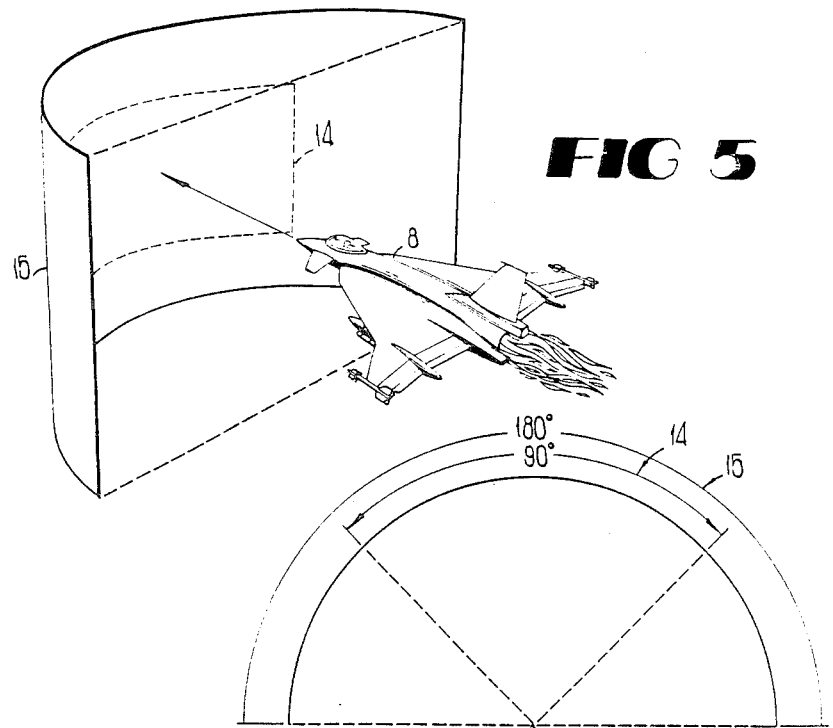
FIG 5
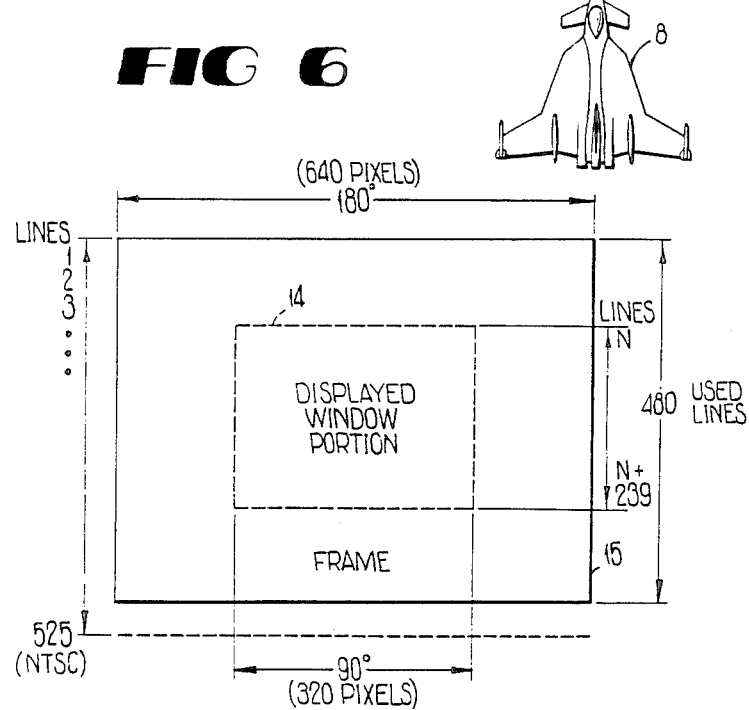
FIG 6
FIG 7

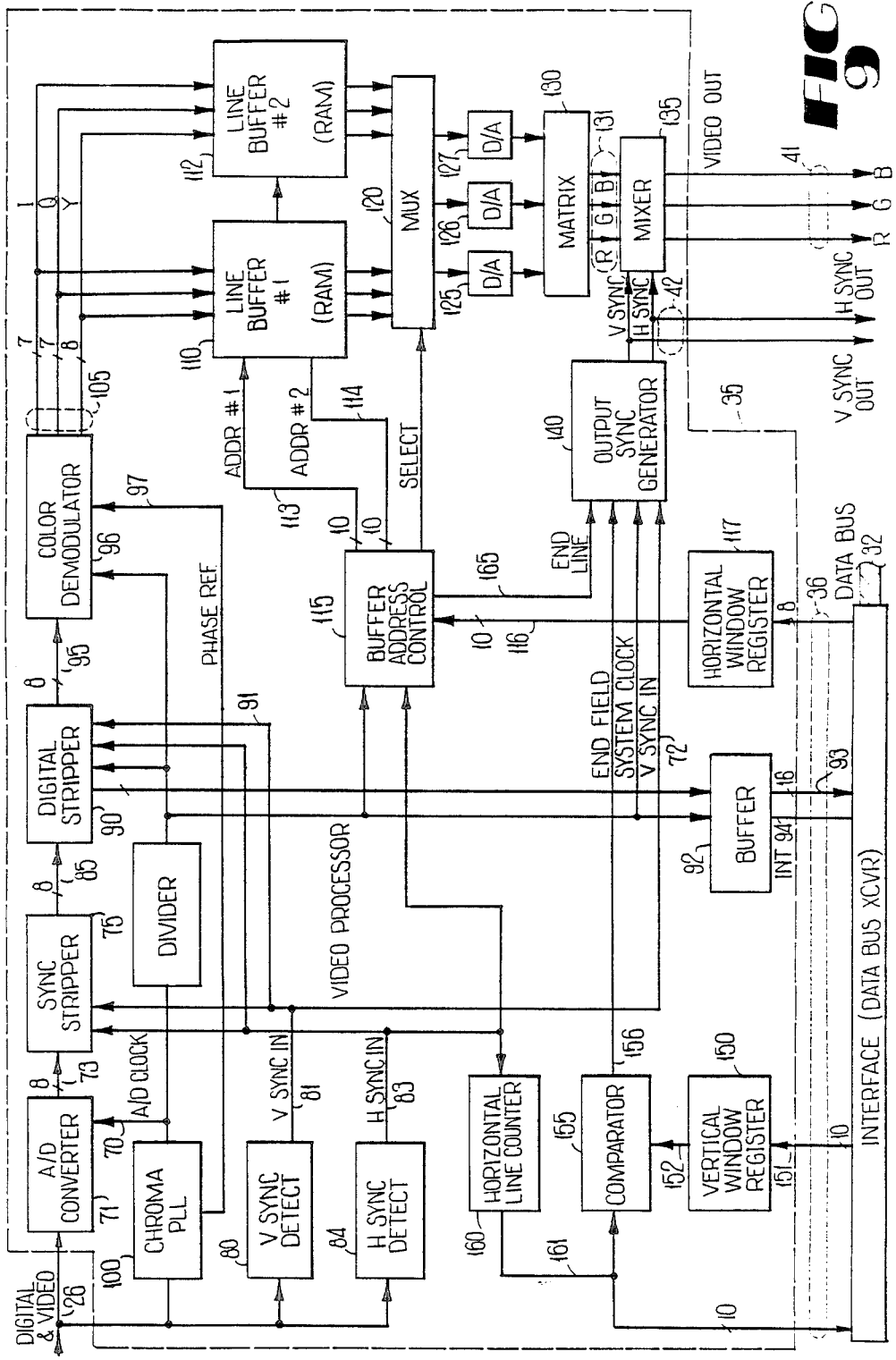

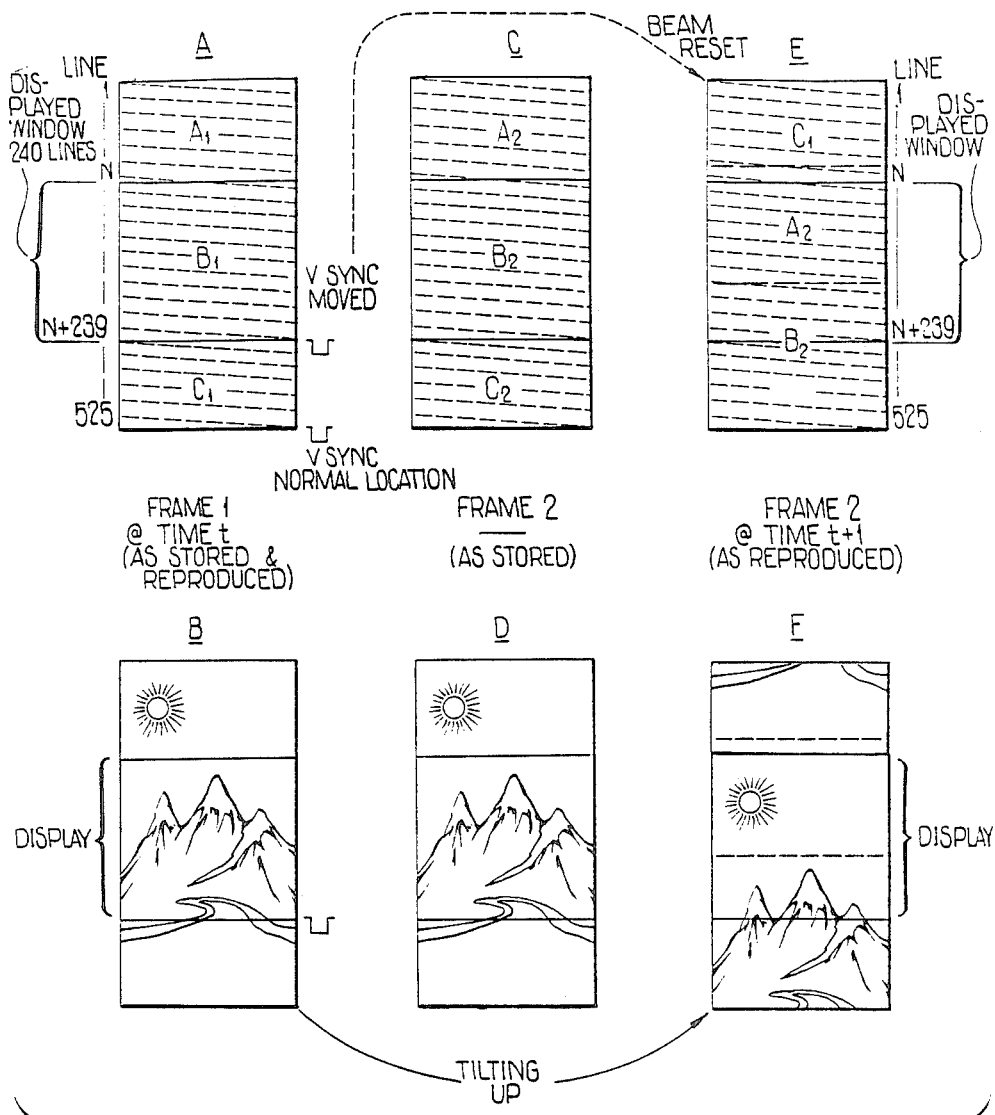
FIG 10 VERTICAL WINDOWING
NODE A → B BRANCH SEQUENCE = A1, A2, A3 —— An-1, An
NODE B → A BRANCH SEQUENCE = B1, B2, B3 —— Bn-1, Bn
TOTAL BRANCH IMAGE STORAGE = An + Bn
FIG 12

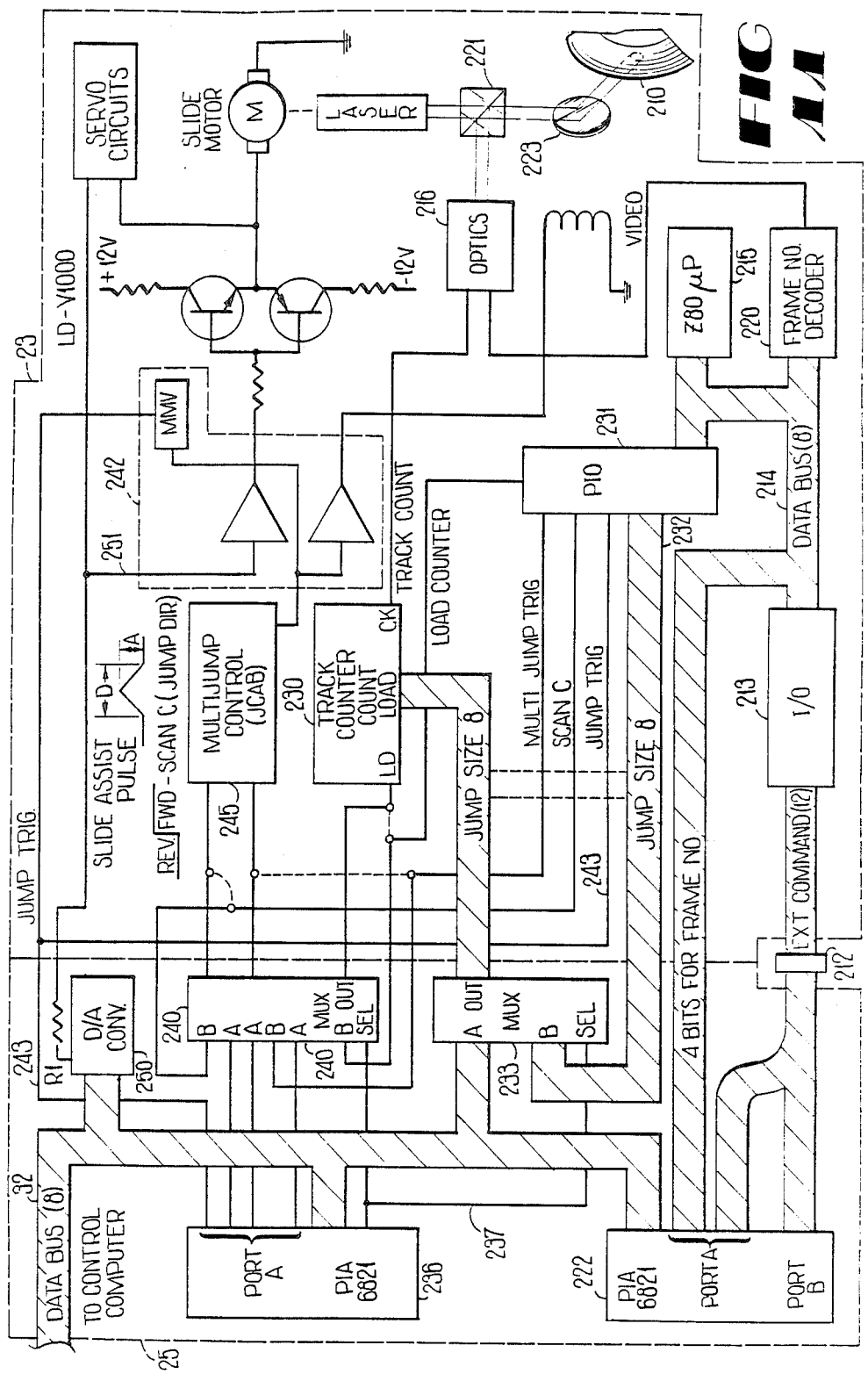

FIG. 17

| | COL 3 | | |
|---|---|---|---|
| | | 4022 | |
| | 4121 | 4122 | |
| | 4221 | 4222 | |
| MATCH | 4321 | 4322 | MATCH |
| LINE | ⋮ | ⋮ | ROW 1  LINE |
| | 4921 | 4922 | |
| | 5021 | 5022 | |

···4901 5001  NODE   5101 5201 5301···5901 6001 6101···
···4902 5002  (1,3)  5102 5202 5302···5902 6002 6102···

| | 5121 | 5122 | |
| U | 5221 | 5222 | ← |
| | 5321 | 5322 | |
| | ⋮ | | |
| | 5921 | 5922 | |
| ↓ | 6021 | 6022 | ↑ |
| | 5923 | 5924 | ROW 2 |
| | 5823 | 5824 | |
| D | 5123 | 5124 | → |
| | 5023 | 5024 | |

TO FIG.16                                                                 TO FIG.18

···4903 5003  NODE   5103 5203 5303···5903 6003 6103···
···4904 5004  (2,3)  5104 5204 5304···5904 6004 6104···

| | 4923 | 4924 | |
| D | 4823 | 4824 | ← |
| | 4723 | 4724 | |
| | ⋮ | | |
| | 4123 | 4124 | |
| ↓ | 4023 | 4024 | ↑ |
| | 4125 | 4125 | |
| | 4225 | 4226 | |
| U | ⋮ | | ROW 3 → |
| | 4925 | 4926 | |
| | 5025 | 5026 | |

···4905 5005  NODE   5105 5205 5305···5905 6005 6105···
···4906 5006  (3,3)  5106 5206 5306···5906 6006 6106···

| | 5125 | 5126 | |
| | 5225 | 5226 | ← |
| U | 5325 | 5226 | |
| | ⋮ | | |
| | 5825 | 5826 | |
| ↑ | 5925 | 5926 | ↓ |
| | 6025 | 6026 | |
| | 5925 | 5926 | |
| | 5825 | 5826 | |
| D | ⋮ | ⋮ | |

TO FIG. 15

```
                    COL 1          MATCH LINE
                   1925 1926
                   2025 2026
                   1927 1928
                   1827 1828
                D    :    :
ROW 4              1127 1128
                   1027 1028
       ┌─────────────────────┬──────┐
       │ 107 207 ··· 907 1007│ NODE │
       ├─────────────────────┤ (4,1)│
       │8 108 208 ··· 908 1008│      │
       └─────────────────────┴──────┘
                    927  928
                D   827  828
                    727  728
                     :    :
                    227  228
                    127  128
                     27   28
                    129  130
                    229  230
                     :    :
                U   829  830
ROW 5               929  930
                   1029 1030
       ┌─────────────────────┬──────┐
       │ 109 209 ··· 909 1009│ NODE │
       ├─────────────────────┤ (5,1)│
       │10 110 210 ··· 910 1010│    │
       └─────────────────────┴──────┘

ROW 8              1035 1036
       ┌─────────────────────┬──────┐
       │ 115 215 ··· 915 1015│ NODE │
       ├─────────────────────┤ (8,1)│
       │16 116 216 ··· 916 1016│    │
       └─────────────────────┴──────┘
                    935  936
                D   835  836
                    735  736
                     :    :
```

TO FIG. 21                                    MATCH LINE

MATCH LINE

COL 1

| | 235 | 236 |
| | 135 | 136 |
| | 35 | 36 |
| | 137 | 138 |
| | 237 | 238 |
| | ⋮ | ⋮ |

ROW 9 → U  937 | 938
       1037 | 1038

| 117 217 ··· 917 1017 | NODE |
| 18 118 218 ··· 918 1018 | (9,1) |

1137 | 1138
    U  1237 | 1238
       1337 | 1338
       ⋮ | ⋮
       1937 | 1938
       2037 | 2038
       1939 | 1940
       1839 | 1840
       ⋮ | ⋮

ROW 10 → D  1139 | 1140
       1039 | 1040

| 119 219 ··· 919 1019 | NODE |
| 20 120 220 ··· 920 1020 | (10,1) |

METHOD AND APPARATUS FOR REPRODUCING VIDEO IMAGES TO SIMULATE MOVEMENT WITHIN A MULTI-DIMENSIONAL SPACE

TECHNICAL FIELD

The present invention relates generally to interactive systems for random access video storage media such as a video disc, and more particularly relates to a method and apparatus for simulating freedom of movement within a multi-dimensional space by selecting and reproducing a particular one of a plurality of selectable sequences of video images, particularly useful for incorporation in a flight simulator.

BACKGROUND

High costs of aircraft operation and desires on the part of governmental agencies to efficiently and effectively train aircraft pilots have resulted in efforts to develop cost effective flight simulator apparatus. The United States Federal Aviation Administration has recently implemented an advanced flight simulation program requiring that flight simulators accurately depict an aircraft's performance on take-off and landing maneuvers as well as on the ground, provide an improved visual response time and increased fields of vision, and provide daylight capabilities plus adverse weather features to allow pilots to upgrade from co-pilot to captain on the same aircraft or to laterally transfer crew members from one aircraft type to another entirely in a simulator.

With operating costs of large jet liners such as a Boeing 747 running $6,500 to $7,000 per hour, commercial carriers and the military alike are interested in lower cost flight simulators for providing total simulation training. Flight simulation apparatus employing high-speed supercomputers and superminicomputers to create graphics displays in real time have been developed in response to this need. Costs of many current flight simulation apparatus are around $250–300 per hour due to the high computational cost of generating realistic real-time images for the flight simulators which can be reproduced rapidly enough to be convincingly realistic. Costs of this order, however, are prohibitive for smaller commercial and private carriers and private pilots who must still rely upon actual flight time for training and upgrading. Moreover, the resolution of the graphics displays of many of these systems leaves much to be desired when the computer-generated images are created to rates high enough to avoid perceptible flicker. Accordingly, there is a need for a means of producing convincingly realistic images for flight simulators at drastically reduced costs which do not involve the real-time generation of sophisticated realistic computer graphics by supercomputers and superminicomputers.

Recent advances in interactive video disc playback devices have provided hope that these devices can be successfully employed in flight simulation. One typical interactive video playback device is shown in U.S. Pat. No. 4,449,198 to Kroon et al. This patent illustrates an interactive video playback device wherein stored video and audio information may be accessed under the control of selection signals received from a computer. Each video frame includes a frame member which is supplied to the computer and allows an operator to activate a branching or selection between frames.

One problem with randomly addressable interactive video discs such as described in the aforementioned patent is that there is no provision for realistically connecting sequences of images so as to provide the illusion of true freedom of movement. Such interactive video disc devices are substantially sequential memory devices not unlike common phonograph records. If an operator wishes to play a different song (the analog of selecting a different sequence of images to simulate movement in a different direction), the needle must be picked up and moved to another portion of the disc.

The extent to which a playback apparatus for a video disc can be moved to another location on the video disc without experiencing information interruption is limited by the amount of buffering the system designer is willing to incorporate and the access time it takes the playback apparatus to move from one portion of a video disc to another. In one popular interactive video disc game known as "Dragon's Lair", the operator is frequently presented with a blank screen and a pause in playback while the system searches for the next sequence of images on the video disc which should follow as a result of operator input. It is apparent that such pauses and screen blankings are unacceptable if truly realistic flight simulation or other simulation of movement within three-dimensional space is to be provided.

One of the main reasons that commercially available video disc players have met only limited success in flight simulation and other random access applications is that most of these devices have but a limited ability to jump or skip tracks on the video disc. One prior art system, known as the model LD-V1000 manufactured by Pioneer Electronics (U.S.A.), Inc., embodies a technique for selectably retrieving video information from any of a plurality of information tracks by deflecting a mirror to reflect a laser beam radially relative to the disc. A laser beam/mirror deflection system such as shown in U.S. Pat. Nos. 3,944,727; 4,451,913; 4,282,598; 3,914,541; and 3,829,622 is employed to scan the beam across a predetermined number of tracks. The number of tracks across which the beam can be scanned is limited by the field of view of the deflecting mirror and the speed and extent to which the mirror can be deflected, and the optics which detect the reflected beam.

The deflecting mirror in the above-described prior art apparatus is physically mounted to a slide mechanism, which translates in a radial direction with respect to the video disc. Servomechanism circuitry and motors are provided for deflecting the mirror between extremes when a multiple track jump is desired, and for actuating the slide to move the mirror toward the jump direction. When a jump is desired, the deflecting mirror, which is lightweight and can be actuated extremely rapidly, is first moved to an extent corresponding to the size of the jump. The slide servomechanism, being far heavier and possessing much greater inertia, also begins accelerating, albeit at a slower rate, to "catch up" with the deflected laser beam, in order to recenter the deflecting mirror into the center of its field of view.

The above-described prior art laser beam/mirror deflecting system has proven to be unreliable in accurately jumping more than about one hundred tracks. In order to successfully implement an apparatus for simulating freedom of movement within a multi-dimensional space, it is necessary to reliably randomly access as many tracks as possible. The laser beam/mirror system is believed to be the best available at present, but still suffers from the disadvantage that is configured to provide jumps in one direction only in increments of ten, for a maximum of about one hundred tracks. The apparatus can only jump in the reverse direction one track at a time, thereby severely limiting the rate at which random seeks can be accomplished in the reverse direction. The "search" mode in this apparatus also possesses the undesirable characteristic that a jump greater than one hundred tracks results in a blank video signal while the proper track number is sought.

Accordingly, in order to successfully implement a method and apparatus for simulating freedom of movement within a multi-dimensional space employing a video disc playback apparatus, these and other problems in effectuating accurate and reliable jumps over multiple tracks must be overcome.

Recent advances in generating realistic graphic images by computer have made it desirable to incorporate new techniques into flight simulation. Although costs of the computers and software for generating realistic computer images are falling rapidly, the computational demands of realistic image creation are immense. Typically, supercomputers such as a Cray X-MP Super Computer, manufactured by Cray Research, can perform over 400 million mathematical computations per second, but even such a supercomputer can produce only around 25 minutes of high quality 70-millimeter computer-generated film images per month. Fast minicomputers can produce an average of only about 2.5 minutes of 70-millimeter film per year. While it is desirable to use newer image synthesis techniques such as fractal geometry for generating images for flight simulation and other applications such as games, it is presently difficult if not impossible to generate and display such images in real time. Accordingly, there is a need for creating highly realistic images off-line, and providing for storage and retrieval of previously-generated images for applications such as flight simulators and games without screen blanking and pauses.

SUMMARY OF THE INVENTION

The present invention provides a solution to the aforementioned problems in real-time image generation for flight simulation and in screen blanking or sequence interruption as a result of delays in random access of stored video images from a storage medium. Briefly described, the present invention provides an interactive video image reproducing apparatus which includes a randomly addressable video image storage means such as a video disc for selectably storing and retrieving a plurality of selectable sequences of video images in addressable locations. Control means are provided for addressing the storage means and for providing retrieved sequences of images. Video image windowing means responsive to the retrieved sequences of video images provides as a video output only a predetermined "window" portion of each image of a retrieved sequence. Each of the stored sequences of video images in the preferred embodiment includes a starting image and an ending image. In accordance with the invention, a window portion of an ending image of any given retrieved sequence substantially duplicates a window portion of a starting image of a retrieved sequence which is reproduced immediately subsequent to the given sequence, thereby providing a relatively imperceptible transition between sequences.

More particularly described, the preferred embodiment of the present invention implements a method for reproducing video images to simulate movement within a multi-dimensional space. The method comprises storing on a video disc a plurality of sequences of video images, each of the sequences portraying a view seen by an operator (such as a pilot in a flight simulator) moving from a given point within the space to a point adjacent to the given point. Each of the sequences includes a starting image associated with the given starting point and an ending image associated with the adjacent point.

First, a sequence associated with simulated movement from the given point to the adjacent, second point is retrieved from the storage medium. A predetermined window of each frame of the video images in the sequence is then displayed on video display means such as a color television monitor. As the sequence of images is displayed, the placement of the window is adjusted within the video frame as a function of operator input. For example, if the operator banks the aircraft left to make a left turn, the window is shifted in the video frame toward the left of the frame and simultaneously rotated to provide the illusion of banking and turning.

As a result of operator input, a second sequence is then selected and retrieved from the storage medium for display subsequent to the first sequence. The system then selects which of a plurality of possible sequences will be reproduced at the end of the given sequence as a function of accumulated operator input. Accordingly, the next sequence of images, which corresponds to movement from the adjacent second point (which has now been reached) to a third point adjacent to the second point, will be retrieved. As in the case of the first sequence, a window portion of each image of the second sequence is displayed. In accordance with the invention, the window portion of an ending image of the first sequence substantially duplicates the window portion of a starting image of the selected second sequence to provide a smooth transition from the first sequence to the selected second sequence.

The disclosed method and apparatus allows used of a conventional selectively addressable video disc upon which is stored the sequences of video images in a standard television format such as NTSC, with certain modifications. Each video image in a sequence comprises a single video frame, but each of the video frames represents a panoramic cylindrical projection of a scene viewable by an operator. The windowing means is operative to select portions of the panoramic projection for display.

In the disclosed embodiment, each of the video frames comprises a predetermined number of horizontal lines and a predetermined number of pixels per line. The windowing means is operative to display the window portion of the frame by displaying a predetermined number of horizontal lines fewer than the total number of lines in the frame, and by displaying a predetermined number of pixels per line fewer than the conventional number of pixels per line.

In accordance with another aspect of the invention, the arrangement of sequences of video images on the video disc is such that there are only a predetermined number of possible sequences which can be reproduced subsequent to any given sequence, and each of the possible subsequent sequences is arranged on the video disc such that the access time of the video disc accessing mechanism is less than one vertical retrace time no matter which of the possible choices of subsequent sequences are selected as a function of operator input. This is accomplished on a video disc in the present invention by assigning frame numbers on a video disc (from 1-54,000) in such a manner so that a jump from the last frame of any given sequence to the first frame of all possible next sequences, is within about 175 tracks, and by modifying the disc player employed to accurately and reliably jump 175 tracks from any given track, within a predetermined access time. The access time is a function of frame or field time and the amount of buffering present in the system. Preferred forms of the present invention minimize the amount of buffering to reduce system cost. These embodiments employ video disc playback systems with enhanced track jumping capability (expressed as number of tracks jumped/frame or field time) and a novel arrangement of distributing the frame sequences on the video disc.

Accordingly, it is an object of the present invention to provide an improved and low-cost flight simulation apparatus.

It is another object of the present invention to provide a video image reproducing apparatus which allows the reproduction of sequences of video images without perceptible transition between sequences.

It is another object of the present invention to provide an interactive video disc playback apparatus wherein selectable sequences of video images are reproduced with relatively imperceptible transitions between consecutive sequences.

It is another object of the present invention to provide a video signal processing apparatus for providing a video output representative of a predetermined window portion of an entire input video frame so that a predetermined window portion less than the entire video frame may be reproduced.

It is another object of the present invention to provide a relatively imperceptible transition between sequences of video images by overlapping portions of images in one sequence of images with portions of images in a subsequently reproduced sequence of images to simulate the freedom of movement through a multi-dimensional space.

It is another object of the present invention to provide a video disc frame layout or arrangement such that a jump from the last frame of a given sequence to the first frame of all possible next sequences is within the tracks jumped/frame time capability of a video disc player.

It is another object of the present invention to provide a method and apparatus for simulating apparent movement through an infinite space by reproducing sequences of video images corresponding to a reflection from a data boundary in data space so that a hypothetical operator or pilot moving through apparent space represented by the video images will not perceive a reflection from the data space boundary, in order to reduce space requirements for video images on the storage medium.

It is another object of the present invention to provide a method and apparatus for reproducing video images to simulate freedom of movement in a multi-dimensional space by reproducing images in greater detail and higher apparent relative speed at lower apparent altitutes than at higher apparent altitudes, in order to conserve storage requirements on the video image storage medium.

These and other objects, features, and advantages of the present invention may be more clearly understood and appreciated from a review of the following detailed description when taken in conjunction with the appended drawings and claims.

BRIEF DESCRIPTION OF THE DRAWINGS

FIG. 1 graphically illustrates a hypothetical airplane moving within an exemplary three-dimensional orthogonal data space.

FIG. 2 illustrates a plane of nodes in the preferred diagonally connected orthogonal data space.

FIG. 3 perspectively illustrates the preferred diagonally connected orthogonal data space of FIG. 2.

FIG. 5 illustrates a hypothetical airplane and the cylindrical panoramic projection of a typical video frame.

FIG. 6 is a top plan view of the hypothetical airplane of FIG. 3 and parameters of the cylindrical panoramic projection.

FIG. 7 illustrates parameters of the window portion of a typical video frame.

FIG. 9 is a detailed block schematic diagram of the video processor employed in the preferred embodiment of FIG. 8.

FIG. 10 illustrates the stripping and reinsertion of synchronization information in a typical video frame processed by the embodiment of FIG. 9.

FIG. 11 is a schematic diagram of the video disc player interface and modifications to the disc player to enhance the multi-track jumping capability.

FIG. 12 illustrates the arrangement of video frames in a typical branch sequence of video images connecting two typical nodes in data space.

FIGS. 15-24 illustrate the method for assigning numbers to the video disc frames so that a jump from the last frame of a given sequence to the first frame of all possible next sequences is within the tracks jumped/frame time capability of the video disc player.

DETAILED DESCRIPTION OF THE PREFERRED EMBODIMENT

Figure 4:
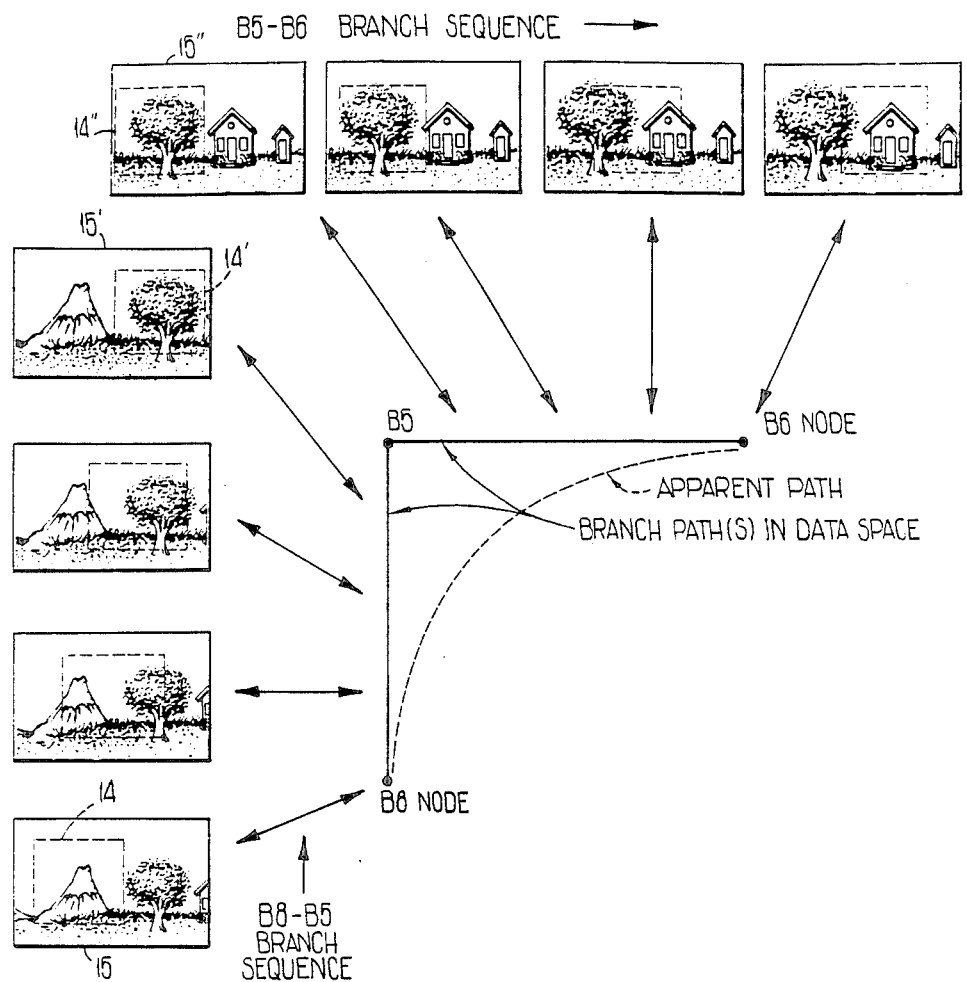
FIG. 4 illustrates the overlapping windows of the ending image of a given sequence of images in the data space of FIG. 1 and the starting image of a sequence subsequent to the given sequence.

The present invention relates to a method and apparatus for simulating freedom of movement within a multi-dimensional space, utilizing a visual display, particularly useful for commercial and military flight and other vehicle/travel simulation, as well as for entertainment such as video games and education. The effect of movement within the space is created by selecting and reproducing a particular one of a plurality of selectable sequences of video images subsequent to a given sequence of video images. The selection of which one of a number of choices of selectable sequences is made in response to operator input indicative of an operator's choice to "move" in a particular direction within the multi-dimensional space. The operator's choice, as provided by an operator control such as a joystick or the like, is manifested by choosing a particular sequence from a set of possible choices of sequences, and presenting the video images to the operator which coincide with the control exercised by the operator.

BACKGROUND CONCEPTS—DATA SPACE VS. APPARENT SPACE

Referring now to the drawings, in which like numerals indicate like elements throughout the several figures, FIG. 1 illustrates a hypothetical airplane 8 which is moving within an exemplary hypothetical three-dimensional space 10. In order to illustrate graphically the simulation of movement within a three-dimensional space, the exemplary three-dimensional space 10 comprises an upper horizontal plane, defined by points or "nodes" A1-A9, an intermediate horizontal plane comprising nodes B1-B9, and a lower horizontal plane comprising nodes C1-C9. Each of the nodes is represented by a letter and a number. The airplane 8 is illustrated as moving from the node B8 toward the node B5 along a line or "branch" defined as "B8-B5". As used herein, therefore, the term "node" shall mean an end point in three-dimensional space which can only be reached along a branch. Nodes are also considered to be "decision points" in the disclosed embodiment, i.e., the choice as to which one of a plurality of branches emanating from a given node is to be traversed after reaching the given node is made *at* the given node by the system. As used herein, the term "branch" shall mean a sequence of a predetermined number of video frames beginning at a first node and ending at an an adjacent second node, with no intermediate nodes. The term "branch" shall also mean a vector or line connecting two nodes. The arrangement of stored video frames in a typical branch is illustrated in FIG. 11, described further below. Typically, a branch contains about 10-20 video frames, although more or fewer may be provided depending on node density.

The travel through the hypothetical space 10 has several aspects which require further elaboration. First, what is viewed by the operator (who receives an impression of moving through the space because of the sequences of images) may be called "apparent space". But the stored video images are arranged in branches on a storage medium in "data space". The airplane 8 travels an "apparent path" in apparent space, as represented by a sequence of images presented to the operator. The apparent path is what the operator perceives as his or her path of travel as a result of the displayed images. The images retrieved and presented are obtained from the storage medium based on a "branch" path, that is, a data path between nodes in data space.

For example, and still referring to FIG. 1, the airplane 8 is illustrated moving along the line B8-B5. It so happens in this case that the branch path coincides with the apparent path, in that the aircraft is moving in data space from node B8 to node B5, and the sequence of images presented to the operator also represents the view seen by the operator as if the airplane is travelling along a line which is coincident with the branch B8-B5.

Second, it is a general principle of operation of the disclosed embodiment that all video images of a given branch sequence are reproduced prior to reproducing any images from a subsequent branch sequence. Accordingly, the airplane "travels" in data space from node to node, but may appear to be travelling in apparent space with greater freedom and flexibility of movement. For example, observe in FIG. 1 that the airplane 8 is approximately midpoint along the branch B8-B5. Should the operator exercise control to veer left toward node B4, to veer right toward node B6, to dive toward node C5, or to climb toward node A5, the apparent path of the airplane will change so that the images presented to the operator present the appearance of veering left, veering right, diving, or climbing. However, the branch path or data path remains B8-B5.

Stated in other words, and referring still to FIG. 1, if the airplane 8 is travelling the branch B8-B5 in data space, and the operator provides control to veer the aircraft toward node B6, all the images associated with the branch B8-B5 are presented, and then all the images associated with the spline B5-B6 are presented. This is more fully discussed in connection with FIG. 4.

Third, each node is connected to a finite number of branches. In FIG. 1, for example, node B5 is connected to nodes B8, B6, B4, B2, A5 and C5. Each node therefore is the starting pont of a finite number (six in this case) of branches leading to the same finite number of adjacent nodes, which are the ending points of the connecting branches. In the particular example of FIG. 1, the geometrical configuration of the data space is orthogonal, with each node being connected only to orthogonally adjacent nodes. Such a geometrical configuration simplifies the production of images for the spline sequences, since there need only be created six branch sequences for each node.

It will also be understood that other geometrical configurations of data space may also be employed, for example, FIGS. 2 and 3 illustrate a preferred data space wherein each node is connected to adjacent nodes along 45, 90, and 180 degree branches. FIG. 2 shows a single plane of such a data space, which will be referred to as a "diagonally connected orthogonal" data space. In this diagonally connected orthogonal data space, a given node is connected to (1) eight adjacent nodes in the same plane (e.g., node D5 is connected to nodes D1, D2, D3, D4, D6, D7, D8, D9), (2) eight adjacent nodes in the plane above the given node, and (3) eight adjacent nodes in the plane below the give node, for a total of twenty-four branches. Straight vertical connections are not made in the disclosed embodiment.

FIG. 3 illustrates a second plane E1-E3-E10-E12 parallel and above plane D1-D3-D10-D12. Nodes in the D-plane are connected by solid lines, nodes in the E-plane are connected by dashed lines, and nodes between the E- and D-planes are connected by dotted lines (for clarity, not all connections are shown).

It should be noted that the diagonally connected orthogonal data space is the preferred data configuration because it provides the advantage of versatility and realism. For example, in the data space of FIG. 1, in order for the airplane to reach node A3 from node B5, one of the following branch sequences must be followed: sequence B5-B2, B2-A2, and A2-A3; sequence B5-B6, B6-A6, and A6-A3; sequence B5-A5, A5-A2, and A2-A3; or sequence B5-A5, A5-A6, and A6-A3. Each of these sequences requires three branches, possibly resulting in an unrealistically long series of images.

On the other hand, in FIG. 3 going from D1 to E5 can be achieved with a single D1-E5 diagonal branch sequence. It should be noted that the diagonal branch sequences will typically be $\sqrt{2}$ times longer than orthogonal branches because they represent the hypotenuse of a right-triangle. Accordingly, in one preferred embodiment all diagonal branch sequences have 28 video frames, while all orthogonal branches have 20 frames.

Also, note in connection with FIGS. 2 and 3 that the diagonal branches cross at points which are not nodes. Thus, it will be appreciated that one can travel in data space from D7 to D8 directly, for example, but cannot select the initial portion of D7-D11 and the latter portion of D10-D8 in reaching D8 from D7, since the system is constrained to reproduce all images along a branch, once that branch is entered in data space.

For ease of description, the remaining discussion will refer to the orthogonal data space of FIG. 1, it being understood that the discussion applies to the diagonally connected orthogonal data space and other geometrical data space configurations as well.

Referring now specifically to FIG. 4, because of the basic rule that all images associated with a particular branch are reproduced prior to reproducing any images from a subsequent branch, all images associated with branch B8-B5 are reproduced, and then if the apparent path is to veer toward node B6, all images associated with branch B5-B6 are presented.

After the branch sequence B8-B5 is presented, a "decision point" occurs at the node B5 wherein the system makes a determination, based on the operator inputs and previous branch history, as to the branch sequence which will be reproduced starting with the node B5. Accordingly, if the operator input has been to veer the airplane toward the node B6, after all the images associated with the branch B8-B5 have been presented, then all the images associated with the branch B5-B6 are presented. Similarly, when travelling along the branch B5-B6 to node B6, there is a decision point at node B6 as to the branch sequence which will be presented next.

The illusion that the airplane 8, while travelling generally in data space in the direction of B5 from B8 veers along an apparent path towards B6, is achieved in the present invention by "windowing", as illustrated in FIGS. 4-7. "Windowing", as used herein, refers to the fact that only a window or portion of an entire video frame is reproduced on the display. The window, or displayed area, of a frame is determined as a result of operator commands to travel along a certain apparent path.

In order to create the illusion of veering toward B6 from B8, it will be understood that each of the images presented to the operator is a "window" or predetermined portion of a video frame. Referring to FIG. 4, there is illustrated a window 14 placed on a video frame 15. The entire video frame 15 is stored on the storage media, but only the window portion 14 is displayed to the operator. If the operator provides control to veer right, the window 14 is moved progressively toward the right portion of the video frame 15 in the succession of frames in the branch sequence, until at the end of the branch sequence B8-B5 the window 14' is presented. It will also be observed that the landscape in the window has appeared to move closer to the operator, as a result of the travel in the three-dimensional apparent space from the node B8 toward the node B5.

After the entire B8-B5 branch sequence has been reproduced, with the window 14 being progressively shifted toward the right hand portion of the video frame, the B5-B6 branch sequence is reproduced. Observe that the window 14", the first window produced from the first frame 15" of the B5-B6 branch sequence, is substantially duplicative of the window 14', which is the last window of the last frame 15' of the branch sequence B8-B5. Thus, a smooth transition and an imperceptible shift is made from the B8-B5 branch sequence to the B5-B6 branch sequence. Notice further that the window 14" has shifted to the extreme left hand portion of the frame 15".

Accordingly, it will be appreciated that in an orthogonally configured data space, the leftmost, rightmost, bottommost, and topmost window portions of the last frame of a branch sequence terminating at a given node overlap with, respectively, (1) the rightmost window portion of the first frame of the left branch extending from the given node (pan left), (2) the leftmost window portion of the first frame of the right branch extending from the given node (pan right), (3) the bottommost window portion of the first frame of the upward branch extending from the given node (tilt up), and (4) the topmost window portion of the first frame of the downward branch extending from the given node (tilt down).

It should be appreciated that, generally, the center window on a given frame portrays a horizontal, forward-looking view. However, it should also be understood that an operator is not constrained to look in the direction travelled in data space. For example, when tilting up in apparent space beyond a certain inclination in a flight simulator, the only display will be sky and clouds, no matter what horizontal plane the operator is on in data space. Thus, in order to conserve storage space, a single scene may be presented to the operator even though climbing through several different horizontal planes of nodes in data space.

It should by now be understood that the illusion of movement from node B8 toward node B6 along an apparent path (in FIG. 4) is created by reproducing the sequence of images in data space identified by the branch B8-B5, followed by the sequence of images in data space identified by branch B5-B6, with portions of the reproduced video frames "windowed" to create the illusion of movement.

As illustrated in FIGS. 5-7, the video frame 15 stored comprises pictorial information obtained from scanning a cylindrical sector, with the window 14 representing a cylindrical subsector within the frame, so that shifting the window moves the operator's field of view. Since the video image reproduced is a planar image, it is necessary to distort the pictorial information so that as the window 14 is shifted about in the frame, a relatively undistorted video picture can be reproduced. This is accomplished in the present invention by generating a video frame which is deliberately distorted.

As shown in FIG. 5, a hypothetical pilot or operator in the airplane 8 looking directly ahead will be presented the window 14 of the video frame 15. Were the video frame 15 to be spatially reproduced, it would have the appearance of being projected on the inside of a cylinder. Accordingly, it will be understood that the deliberate distortion introduced into the video information prior to recording on the storage media is to project the pictorial information onto the inside of a curved cylinder. It is also specifically contemplated that spherical projections, for a 360° panorama, are also possible and only involve mathematical transformations.

FIG. 7 illustrates the relative dimensions of the window 14 and frame 15 in the disclosed embodiment. In width, the window represents a 90° panorama, while the stored video frame is a 180° panorama, so that the window portion displayed is about half the width of the entire frame. For NTSC video signal formats, the entire frame is about 640 pixels wide because of bandwidth limitations, and the window is about 320 pixels. In height, the entire video frame is 525 lines for NTSC, but the displayed window is 240 lines, which is half of the 480 usable lines per frame in the disclosed embodiment. It will thus be appreciated that any given window begins at line N and ends at line N+239, where N is between 1 and 241. It should also be understood that the values of 180° for the frame panorama and 90° for the window are arbitrary, and that any geometrical layout and projection may be utilized, for example, spherical projection. Generally, the minimum frame or sector angular width equals the field of view of the window (90° for the example of FIGS. 5–7), plus the angle between branches (also 90°).

SYSTEM OVERVIEW

Figure 8:
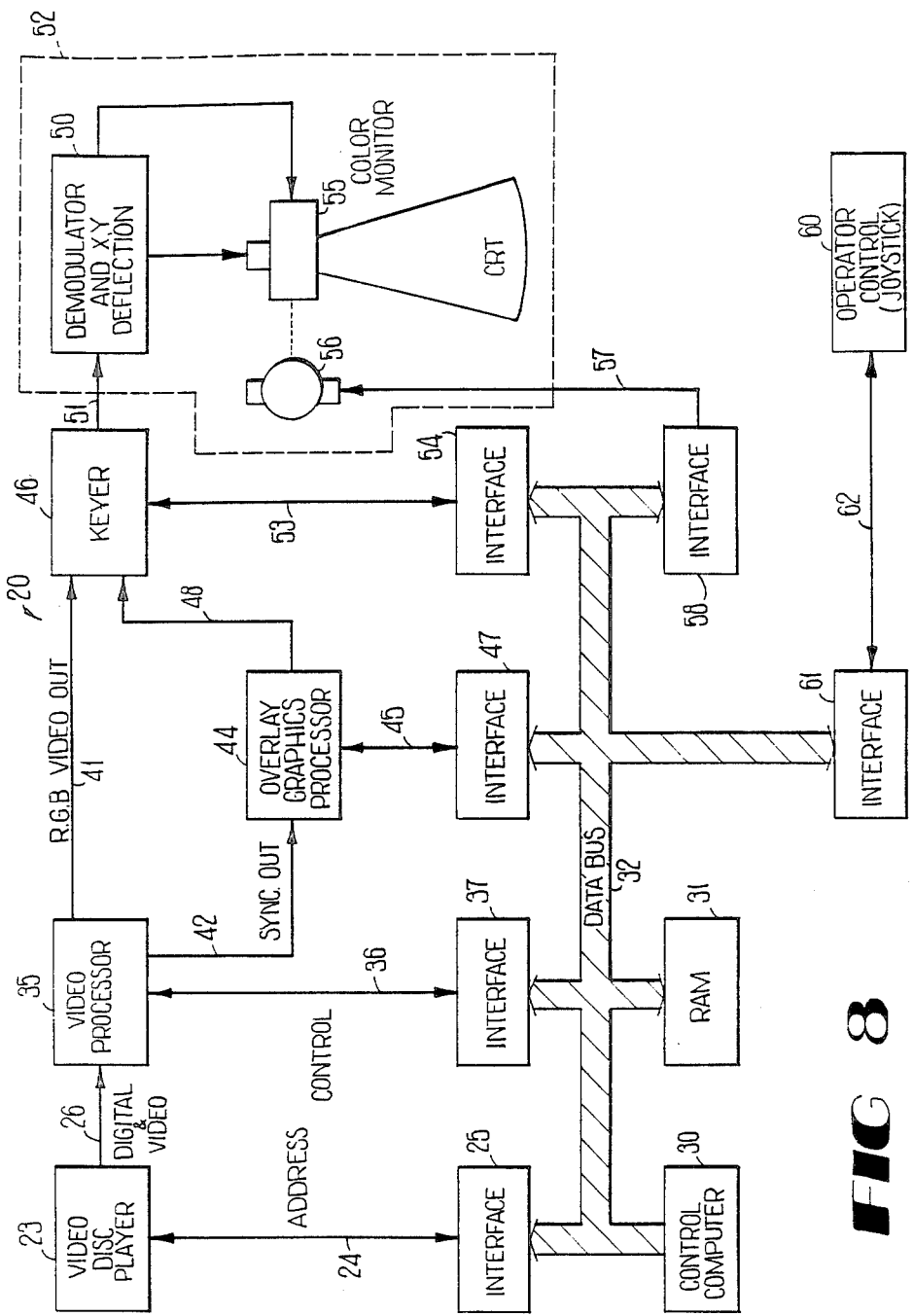
FIG. 8 is a block schematic diagram of the preferred embodiment of the apparatus for reproducing video images to simulate movement within a multi-dimensional space.

Referring now to FIG. 8, there is illustrated in block diagram form a system 20 for storing and reproducing sequences of video images to simulate movement through a multidimensional space. Simply described, the system 20 comprises a video disc player for storing and retrieving video frames, a control computer for accessing particular sequences of stored frames on the video disc, circuitry for processing signals from the video disk player to provide a video output, and means such as a color TV monitor responsive to the video output for reproducing and displaying the video images.

More particularly described, the system 20 includes a video disc player 23. The disc player 23 employed in the preferred embodiment is a conventional selectivity addressable optically-readable laser disk player such as a type LD-V1000 manufactured by Pioneer Electronics (U.S.A.) Inc. As known to those skilled in the art, the disc employed in the disc player is removable and replaceable; the video information encoded on the disc is organized in a spiral track, and the portion of the track traversed in one revolution of the disc contains an FM-encoded video signal for one video frame, the video signal being in accordance with television industry standards such as NTSC. Each disc contains about 54,000 video frames; at a speed of 30 revolutions per second (for 1/30 second per frame), this represents about 30 minutes of viewing time.

Each 525-line frame provided by the preferred video disc player comprises two interlaced fields, with appropriate vertical synchronization signals separating fields every 1/60 second. Accordingly, each field consists of 262½ lines. Each field includes 20 lines in the vertical interval, resulting in 242½ usable lines. However, the preferred embodiment employs only 240 lines per field for ease of computation, providing a frame having 480 usable lines for imagery. The video images recorded on the frames of the video disc are preprocessed to represent the panoramic projection before recording on the disc. The video disc player 23 receives an address input on line 24 from a computer interface circuit 25, which in turn receives address signals from a central control computer 30. The control computer 30 selects sequences of addresses on the video disc to create the branch sequences described above. The disk player 23 provides as its output on line 26 a video output signal DIGITAL+VIDEO which comprises multiplexed digital and video signals. These signals will be described in greater detail below.

The DIGITAL+VIDEO signals on line 26 are provided as an input to a video processor circuit 35, which is illustrated and described in more detail in connection with FIG. 9. The video processor 35 receives and transmits control signals on lines 36 via a computer interface circuit 37 so that the computer 30 can communicate with and control the video processor. The video processor provides as its outputs a signal denominated VIDEO OUT on line 41, which is a conventional NTSC video signal which can be reproduced on a video television monitor which is vertically overscanned, and video synchronization signals denominated SYNC OUT on line 42, for purposes described below.

The central control computer 30 in the disclosed embodiment is a type MC68000 microcomputer manufactured by Motorola Inc., of Phoenix, Ariz. The computer 30 communicates with various peripheral interface circuits via a data bus 32. A random access memory (RAM) 31 for program and data storage is also connected to the data bus 32.

The system 20 further includes an overlay graphics processor 44 for creating special graphics displays independently of (but synchronized to) the video signal from the video disc. For example, in applications of the present invention related to flight simulation, the overlay graphics processor creates images such as instruments, gauges, or other objects not originally recorded on the video disc. In applications related to games, images such as missiles, aliens, and the like may be created for interaction during game play. The overlay graphics processor 44 receives command signals over line 45 from a computer interface circuit 47 so that the control computer 30 can control the creation and placement of overlay graphics onto the displayed video window, as well as control the effects of interactions with the created graphics. It should be understood that the overlay graphics processor can comprise a second video disc player and video signal processor.

The output of overlay graphics processor 44 is provided on line 48 to an analog gate or keyer circuit 46, which selects the signal VIDEO OUT from the video processor or the output of the overlay graphics processor to create a time-multiplexed composite video signal which is provided on line 51. Keyer 46 is controlled over lines 53 by a computer interface circuit 54, which is connected to the data bus 32 and receives control signals from the computer 30. The signal on line 51 is provided to a video demodulation and deflection circuit 50 of a modified conventional color monitor 52, which is responsive to the composite video signal to demodulate the chrominance and luminance information from the video signal and to drive horizontal (X) and vertical (Y) deflection circuits for display of the video images on the color monitor 52. The preferred color monitor is modified so that the vertical deflection amplifier will overscan, i.e., the amplifier accepts a broad range of input voltage but is responsive to guide the electron beam into the viewable area of the CRT for a narrower range. Thus, for portions of each field, the CRT beam will be off-screen, either above or below the screen.

The color monitor 52 in the preferred embodiment is also modified to rotate the displayed image, to create the illusion of banking in the simulated airplane. This is accomplished by use of a rotatable CRT deflection yoke 55, which is rotatably coupled to a yoke motor 56. Motor 56 is controlled via lines 57 from a computer interface circuit 58, which is connected to the data bus 32 and receives control signals from the computer 30. It will be understood that the computer under program control causes images displayed on the CRT of the color monitor 52 to rotate as if the simulated airplane were banking, by rotating the deflection yoke 55.

Image rotation may also be accomplished electronically in the video processor with a full frame buffer, by mathematical transformation. Such electronic rotation simplifies interaction with the overlay graphics processor, since displays such as instruments and gauges are not rotated.

The system further includes operator controls 60 such as a joystick, elevator controls or pedals, throttle, and the like, signals from which are provided to a computer interface circuit 61 over line 62. Signals manifesting operator control are digitized by the interface circuit 61 and provided to the control computer 60 so that appropriate commands may be generated to retrieve and display video images, to select an apparent path within the space, to interact with overlay graphics created by the overlay graphics processor, to rotate the image for banking, etc.

VIDEO PROCESSOR CIRCUIT

Referring now to FIG. 9, there will be described the video processor circuit 35 which receives the composite DIGITAL+VIDEO signal from the video disc player, receives control information from the computer for vertical and horizontal windowing, and provides a video signal out for display on the color monitor. The input signal provided by the video disc player on line 26, as mentioned above, is a composite digital and video signal with digital information modulated onto the signal. The video portion of the signal is preferably standard NTSC format, except that each video frame has been preprocessed to incorporate the 180° cylindrical projection illustrated in FIGS. 5–7, and includes 525 horizontal scan lines per frame.

It should be understood that the creation of images for providing the illusion of movement through a three dimensional space may be accomplished in several different manners. First, all images may be entirely computer-generated by a high resolution computer graphics system such as a Cray X-MP supercomputer, taking into account the cylindrical projection. Second, the images may be captured with a standard video imaging device such as a TV camera, fitted with 180° wide-angle lens to pre-distort the image prior to recording. Other techniques may occur to those skilled in the art.

The digital information in the DIGITAL+VIDEO signal is modulated or multiplexed onto the standard NTSC video signal using conventional techniques known to those skilled in the art. In the preferred embodiment, digital information is analog encoded in the video signal during horizontal and vertical retrace periods. Accordingly, the digital equivalent of the video signal during these times represents the encoded digital information.

The digital information multiplexed along with the video signal serves various purposes. For example, when moving within the hypothetical three-dimensional space, certain objects or features in the space may appear at a distance from the point of viewing presently being displayed, e.g., a mountain may be 20 miles away, and this information is provided to the central computer digitally during the display of the mountain. The distance to objects is important in determining whether given a continued path of travel and velocity, the airplane will hit the object.

Sound control information to accompany a particular frame may also be carried digitally. For example, if the airplane is flying in a narrow canyon special effects sound signals digitally encoded cause an echoing effect. Also, the volume level is reduced for high altitude flying and increased for low altitude flying.

The digital data also carries information pertaining to the distance to adversaries. Adversaries include fixed adversaries such as a missile launcher, and "static-dynamic" adversaries such as a rotating gun turret which is fixed or static in location but which has dynamic characteristics such as rotation of the turret about an axis. The distance from the airplane to these adversaries may be important in the computation of missile or projectile trajectories and ranges, so that a realistic effect may be created when these adversaries interact with the simulated airplane.

Other encoded digital information may include behavior information of objects which may appear in a frame which is generated by the overlay graphics processor. For example, an object may be created by the overlay processor 44 which moves, rotates, or shoots, and information pertaining to these behavioral characteristics may be important for allowing the overlay processor to generate a realistic object.

Finally, the digital signal includes frame, branch, and node information, so that the control computer 30 can remain synchronized at all times. For example, each video frame is identified by a frame count or other frame identifying indicia Also, each frame is logically connected to the next frame in the branch sequence, for example with a doubly-linked list structure, so that the control computer is always able to determine the next frame to be accessed from the video disc based on information pertaining to the current frame being displayed.

The digital and video information in the DIGITAL+VIDEO signal received on line 26 is initially received in the video processor circuit 35 by an analog-to-digital (A/D) converter circuit 71, which digitizes the video signal into eight-bit words. Due to the high frequencies of the video signal, the A/D converter 71 is a high-speed converter such as a type TDC 1007 20 MHz converter manufactured by TRW LSI Products Division, La Jolla, Calif. The A/D converter 71 is preferably clocked at 14.3 MHz, which is four times the color burst frequency of 3.58 MHz. The clock input to A/D converter 71 is the A/D CLOCK received on line 70.

The output of A/D converter 71 is provided on lines 73 to the input of a sync stripper circuit 75. This circuit is responsive to remove information during the horizontal and vertical blanking periods so that the synchronization information in the video signal does not have to be stored. The sync stripper 75 receives as one input a signal denominated V SYNC IN from a vertical synchronization detection circuit 80, on line 81. The vertical synchronization detect circuit 80 is responsive to vertical sync pulses in the input video signal received on line 26 to provide an output signal on line 81 at the time of the last pulse, indicating the end of each field in the video frame.

Also provided to the sync stripper circuit 75 is a signal denominated H SYNC IN on line 83 from a horizontal synchronization detection circuit 84. This circuit is responsive to the horizontal synchronization pulses in the video signal received on line 26 to provide an output on line 83, indicating that the end of a video line has been detected.

It will be appreciated that the signals V SYNC IN and H SYNC IN on lines 81, 83 condition the sync stripper circuit 75 to force the output of A/D converter 71 to all zeros.

The output of sync stripper 75 is provided on lines 85 to the input of a digital stripper circuit 90. The digital stripper also receives as an input the system clock on line 72, as well as the V SYNC IN signal on line 81 and the H SYNC IN signal on line 83. During the vertical and horizontal retrace periods, as indicated by the V SYNC IN and H SYNC IN signals, the digital information on line 85 is routed via lines 91 to a buffer circuit 92. The buffer circuit 92 also is clocked by the SYSTEM CLOCK on line 72. The output of buffer 92 is provided on lines 93 to computer interface circuit 37 so that the digital information stripped from the video signal can be read by the control computer over the data bus 32. When the buffer 92 contains all the data from one frame, an interrupt signal INT on line 94 is provided to the interface circuit 37 from the buffer 92. The interrupt signal causes the interface circuit to request interrupt service by the computer.

The output of digital stripper 90 is provided on lines 95 to a digital color demodulator circuit 96. The color demodulator receives the SYSTEM CLOCK as an input, and also receives a signal denominated PHASE REF signal on line 97. The PHASE REF signal originates from a phase-locked loop circuit 100, which is responsive to the chroma burst of the input video signal on line 26. As known to those skilled in the art, the phase lock loop circuit 100 locks to the 3.58 MHz color subcarrier of the video signal so that phase demodulation of the encoded color video signal may be effectuated. The color demodulator 96 is responsive to the PHASE REF signal to provide the conventional demodulated portions of a color video signal designated I, Q, and Y, in digital form. As known to those skilled in the art, the I and Q signals contain the quadrature-encoded $R-Y$, $B-Y$, and $G-Y$ color video signals, while the signal is the conventional luminance signal. In the disclosed embodiment, color demodulator 96 provides the I and Q signals to seven bits of resolution, and the Y signal to eight bits of resolution, although a system having Y of six bits and I and Q of five bits has produced acceptable results.

The demodulated I, Q, and Y signals are provided on lines 105 to the inputs of two parallel video line buffers 110, 112, designated respectively LINE BUFFER #1 and LINE BUFFER #2. The line buffers 110, 112 each store one complete digitized horizontal video line, preferably in random access memory. The line buffers are operative to output the digitized lines either in a first-in, first-out (FIFO) manner or a last-in, first-out (LIFO) manner. Whether the outputs of the line buffers are FIFO or LIFO depends upon the manner in which the line buffers are addressed by a buffer address control circuit 115. Preferably, the line buffers are constructed with high-speed random access memory (RAM) for ease in selecting only predetermined portions of a particular digitized video line for output in order to implement horizontal windowing. Horizontal windowing, it will be recalled, is effectuated in the disclosed embodiment by selecting a predetermined portion of a video line for display. Providing the input digitized video line either FIFO or LIFO provides the ability to output a video line either in the sequence in which the line was received from the video disc or alternatively reversed, for purposes of satisfying boundary conditions which require that the reproduced images be "reflected" at the boundaries of the hypothetical three-dimensional space. The concept of "reflection boundaries" is described in greater below.

It should also be noted that the color demodulator 96 can be placed after the line buffers (or full frame buffer, if employed). Such a configuration would reduce the required size of the buffers since NTSC modulated signals require only eight-bit wide RAM rather than the wider RAM required for YIQ demodulated signals. Those skilled in the art will also understand that the relative positions of certain subsystems such as sync stripper, color demodulator, buffer memory multiplexer, matrix, output sync generator, etc., in the video signal path may be chosen to optimize different parameters such as memory size, number of components, speed of access, etc., in different embodiments of the present invention.

The buffer address control circuit 115 receives as one input the H SYNC IN signal on line 83, which indicates the end of a horizontal line being input. The buffer address control also receives as an input ten parallel bits of information on lines 116 from a horizontal window circuit 117, which represent a starting address within the line buffers 110, 112 for output of digitized video information in order to implement horizontal windowing. The buffer address control 115 also receives as an input the SYSTEM CLOCK on line 72.

As outputs, buffer address control 115 provides ten parallel bits on lines 113 denominated ADDRESS #1 and the same number of parallel bits on lines 114 designed ADDRESS #2 as address information for line buffers 110, 112. Ten bits provides for addressing 1,024 addressable locations for storage of the digital I, Q, and Y signals. At the nominal sampling rate of 14.31818 MHz (four times subcarrier), each horizontal line, being reproduced at frequency of 15.75 KHz results in 910 samples per line, which are stored in the line buffers 110, 112.

Additionally, the buffer address control 115 provides a SELECT signal on line 118 which controls the selection of outputs from either line buffer #110 or line buffer #2 212 at a multiplexer 120. Multiplexer 120 is a conventional digital multiplexer which selects the outputs of either line buffer 110 or line buffer 112 for conversion into an analog signal.

It should be understood that the line buffers 110, 112 operate in a "flip flop" mode, that is, one of the line buffers receives digitized video signals on lines 105 and stores the entire received line of digitized video signal, while simultaneously the other line buffer is recalling from addressable locations in memory a predetermined portion of a prestored digitized video line for provision to the multiplexer 120. Upon completion of the provision of the predetermined portion of the video line to be displayed, the other line buffer will be full and ready to output. Accordingly, it will be understood that the buffer address control 115 alternately fills one line buffer while emptying the appropriate portion of the other line buffer.

The output of multiplexer 120 is provided to three digital-to-analog (D/A) converters 125, 126, 127, one for each of the digital I, Q, and Y signals. The analog outputs from the D/A converters are provided to the inputs of a conventional matrix circuit 130, which converts the analog I, Q, and Y signals into the conventional R, G, and B signals on lines 131.

The R, G, and B video signals are then provided to a mixer 135 which combines the R, G, and B video signals with synchronization signals denominated V SYNC OUT and H SYNC OUT from an output sync generator or inserter circuit 140. The outputs of mixer 135 are the R, G, and B video signals designated VIDEO OUT provided on lines 41 to the other circuitry.

The output sync generator circuit 140 is responsive to create vertical and horizontal synchronization pulses to which the color monitor is responsive at appropriate times during the provision of the R, G, and B color video signals to cause vertical and horizontal retrace and to implement windowing.

In order to implement vertical windowing, there is provided a vertical window register 150 for receiving and storing an eight bit digital number representing the bottom line number of a frame to be displayed. The vertical window register 150 is connected by lines 151 to the interface circuit 37, and thus is loaded by the control computer over the databus 32. The number which may be loaded into the vertical window register 150 can be the binary equivalent of number between decimal zero and 240. Since there are 525 lines per video frame stored on the video disc, the displayed window can end on any of the lines 240 through 480 (lines 481–525 are not displayed in the disclosed embodiment).

The output of vertical window register 150 is provided on lines 152 to a digital comparator circuit 155. Also provided as an input to comparator 155 is the output of a horizontal line counter 160, on lines 161. The horizontal line counter 115 counts the H SYNC IN signals received on line 83 from the horizontal sync detect circuit 84, which occurs at the end of each horizontal line of the video frame being provided from the video disc. When the horizontal line count as maintained by horizontal line counter 160 equals the desired line count stored in the vertical window register 150, the comparator 155 provides a signal END FIELD on line 156 indicative of the end of the displayed portion of the video field.

The END FIELD signal is provided as an input to the output sync generator circuit 140, which also receives as an input the V SYNC IN signal provided on line 81 from the vertical sync detector circuit 80. The buffer address control 115 provides a signal labelled END LINE on line 165 to the output sync generator circuit 140, when the last stored digitized I, Q, and Y signals of the current line being displayed have been recalled from memory. This END LINE signal occurs at the end of the predetermined window portion of the line displayed, that is, at the edge of the window as indicated by the value stored in the horizontal window register 117. The output sync generator circuit 140 is responsive to the END LINE, V SYNC IN, and END FIELD signals to create horizontal sync signals or pulses for an RGB monitor at the end of each line of the displayed window portion of the video frame, to create vertical sync signals at the end or bottom the displayed portion of each field of the video frame, and to insert these created sync signals into the video signal being displayed. These sync signals are labelled V SYNC OUT and H SYNC OUT, and are provided on lines 42 to the mixer 135 and to external circuitry (namely, the overlay graphics processor). It will thus be appreciated that the output sync generator 140 reinserts the synchronization information at the appropriate times at the edges of the window of the frame, the time at which the rightmost edge of window has been reached in each line (the time at which the END LINE signal occurs), and the time at which the line count maintained by horizontal line counter 160 equals the number stored in the vertical window register 150.

It will be understood that the width of the horizontal window is a predetermined number of digital words stored in the line buffers 110, 112, and that the horizontal window register 117 stores address in the addressable memory of the line buffers at which the portion of the digitized stored line to be displayed begins. When the end of the displayed portion of the horizontal line (i.e. the rightmost vertical edge of the window) has been reached, an internal counter in the buffer address control 115 provides the signal on line 165 denominated END LINE to the sync inserter circuit 140. The output sync generator is then responsive to create the horizontal synchronization pulses and provide these pulses to the mixer 135, where it is combined with the now-analog video signal being provided by the matrix 130.

It should be noted that for horizontal windowing the number of digital words per line displayed is normally one-half the number of words written into the line buffers, but the output line time is always the same. Thus, it will be understood that while the video data output rate is normally half the input rate, the line rate is the same. It should also be noted that varying the predetermined number of output words per line displayed but holding the time for each line constant provides a "zoom" effect.

It should by now be understood that the output of the mixer 135 comprises conventional RGB video signals labelled VIDEO OUT on line 41, which embody modifications to implement vertical and horizontal windowing. Although a full 525 line by 180 degree panoramic video frame is provided line by line as the input to the video processor 35, it will now be appreciated that the VIDEO OUT signals on line 41 represent a 525-line video signal (each frame includes 480 usable lines in the disclosed embodiment) including appropriately placed horizontal sync pulses to indicate the end of a video line, with vertical sync pulses being inserted to indicate the end of the field being displayed.

WINDOWING

As described above, in the disclosed embodiment each video frame stored on the video disc comprises 525 video lines and corresponds to a panoramic width of 180 degrees, but only a portion of each stored frame is displayed. As described in connection with FIG. 9, horizontal windowing, that is, the selection of a portion of each stored video line for display, is accomplished by storing an entire video line digitally in line buffers 110, 112, and by retrieving and converting into an analog video signal only those portions of the line within the window. The end of each line is marked by the H SYNC OUT signal, which represents the end of a horizontal line.

For vertical windowing, windowing is effectuated by "overscanning" or overmodulating the vertical deflection amplifiers so that the displayed lines have a signal amplitude sufficient to drive the electron beam of the color monitor within the displayed area but the undisplayed lines drive the electron beam off-screen. That is, all 525 lines of each video frame are received from the video disc, but only a selected portion consisting of a contiguous sequence of 240 lines are actually visible on the monitor, with the remaining 285 lines of the frame being scanned in a non-visible area.

As shown in FIG. 10A, the displayed window consists of 240 horizontal lines (120 lines per field), for example lines N through N+239, represented by area $B_1$. However, the frame being 525 lines in total height, lines 1 through N (area $A_1$) and lines N+240 through 525 (area $C_1$) overmodulate the vertical deflection amplifier, and hence are not displayed. The vertical retrace or vertical sync signal (V SYNC) normally occurs at the end of horizontal line 525 (more accurately, at the end of each 120 line field). However, the output sync generator circuit 140 creates and inserts a vertical sync pulse at the end of line N+239 for vertical windowing (again, more precisely at the end of line N+120 of each field).

For the example shown in FIG. 10B, the displayed lines N through N+239 consist of mountains and a portion of a river, while the undisplayed portion of the stored frame includes the sun in the upper frame portion (lines 1 through N) and the remainder of the river in the lower frame portion (lines N+239 through 525).

In order to move the window vertically, that is, to tilt upwardly or downwardly, it should be understood that the vertical synchronization pulses are inserted at the end of the last line of the portion of the field of video frame to be displayed. In order to prevent loss of synchronization, in normal operation the tilting will occur only one line at a time, that is, each successive frame changes N by one. For example, if tilting up is indicated, the inserted V SYNC will occur in field 1 of frame 1 at line N+120, in field 2 of frame 1 at line N+120, in field 1 of frame 2 at line N+119, in field 2 of frame 2 at line N+119, etc.

Tilting a maximum of one horizontal line per frame is preferred so that the phase locked loop circuitry responsive to the vertical sync signal does not lose lock. However, it will be appreciated that other techniques for more rapid tilting may occur to those skilled in the art, for example buffering an entire frame instead of alternating lines allows tilting as rapidly as desired.

An exaggerated example of this tilting movement is illustrated in FIGS. 10C-10F. Assume that area $B_1$ in frame 1 is displayed at time t, but that operator controls have indicated that tilting up is desired. The operator has thus indicated that the airplane should "climb" so that he will be looking upwardly towards the sun as shown in FIG. 10F. Thus, the displayed area represented by area $A_2$ of frame 2 (which includes the sun) should be displayed at time t+1, after a display of frame 1.

The V SYNC signal inserted at the end of line N+239 (the end of area $B_1$) causes reset of the beam of the monitor, even though there remains to be scanned lines N+241 through 525 of frame 1 before area $A_2$ of frame 2 can be displayed. The effect of moving or inserting the vertical sync at the end of area $B_1$ is to cause beam reset prematurely, that is, before the point at which the vertical sync would normally occur, driving the beam of the monitor to the reset position before lines N+240 through 525 are retrieved from the video disc and processed by the video processor 35. This has the effect of "reproducing" or scanning area $C_1$ in the overmodulated or undisplayed area (which is off-screen) at time t+1, as shown in FIG. 10E. Then, subsequent to area $C_1$ at the end of frame 1, there will be provided from the video disc, video signals for area $A_2$ from frame 2. Area $A_2$ will then be displayed in the visible area of the color monitor, which is responsive to the voltage levels driving the vertical deflection amplifier to actually move the beam. In contrast, area $C_1$ overdrives the beam and prevents any actual display. The effect is to tilt upwardly from time t to time t+1, so that the sun is visible as shown in FIG. 10F.

VIDEO DISC PLAYER INTERFACE AND MODIFICATIONS

In order to provide the capability to reliably jump a multiple number of tracks radially on the video disc, it has been found necessary to make certain modifications to existing video disc playback devices such as the video disc player 23. It is desired to enable the video disc player to reliably jump as many tracks as possble, more or less randomly, so that upon display of any given video frame, the next video frame in sequence is within the jumping capability of the video disc player. In the preferred embodiment, as will be described in more detail below, the video disc player 23 has been modified so that a jumping capability of 175 tracks in either direction in increments of one track are possible. The layout of frames on the video disc in the preferred embodiment disclosed herein is such that from any given video frame, the maximum jump to reach the next video frame in any sequence is 168 tracks. Accordingly, it will be appreciated that this maximum jump is well within the physical capabilities of the modified video disc player 23.

The preferred video disc player, model LD-V1000, as manufactured provides a much more limited jumping capability. The unmodified disc player can only jump forward, that is, in the direction of the spiral track toward the outside of the disc, in increments of ten. Backward jumps are possible only in increments of one track per frame time.

Referring now to FIG. 11, there will now be described the modifications to the preferred video disc player 23 which enable reliable jumps of 175 tracks in increments of one. As described earlier, the control computer 30 (FIG. 8) controls the video disc player via data bus 32, which is provided to interface circuit 25. Commands to the disc player 23 are normally received through a connector 212, which receives eight bits of digital information corresponding to track number, as well as four control bits which determine whether commands are being provided or status information is being received from the disc player. These twelve lines, designated EXT COMMAND, are provided to an input-output (I/O) circuit 213 in the disc player, which is connected to the data bus 214 of the control microcomputer 215 in the disc player.

As known to those skilled in the art, video signals modulated on a video disc 210 are detected by an optics assembly 216, which receives a reflected beam of laser light from a beam splitter 221. A deflectable tracking mirror 223 moves the laser beam radially with respect to the video disc 210.

A frame number decoded circuit 220 in the disc player receives the VIDEO signal from the optics assembly 216 in the disc player and decodes information imbedded in the video signal during the vertical retrace or blanking interval which corresponds to the frame number. The video discs operable with the preferred video disc player include frame number information in the vertical retrace interval of every other video field. The frame member decoder 220 is responsive to this information to place four bits of binary-coded decimal (BCD) data on the data bus 214 at an appropriate time for display or output.

In the preferred embodiment, these four BCD bits are provided to the interface circuit 25 so that the frame number information can be read. This is accomplished by connecting the four least significant bits of the data bus 214 to four lines of port A of a peripheral interface adapter (PIA) in the interface circuit 25. In the disclosed embodiment, all PIA's are type MC6821 manufactured by Motorola. Accordingly, it will be appreciated that the interface circuit 25 receives frame number information from the disc player 23.

Port B of the PIA 222, plus the other four bits of port A, are provided to the connector 212 to provide external commands and receive status information to the I/O circuit 213 in the disc player. Accordingly, the interface 25 detects the status of the disc player and provides commands within the operational capability of the disc player via the connector 212 in the conventional manner.

Normally, the control microcomputer 215 in the disc player, if provided with a command to jump a number of tracks beyond its capability, will not respond to the command. Accordingly, in the disclosed embodiment it is necessary to by-pass or circumvent this nonresponsive condition in the disc player in order to jump more than a preprogrammed number of tracks. In the preferred embodiment, the size of the jump is controlled by breaking the connection between the control computer and a track counter 230 which is loaded with the count of the number of tracks to be jumped. The track counter 230 is normally loaded with an eight bit track count from a peripheral input/output (PIO) circuit 231, which is controlled over data bus 214 from the control microcomputer 215. These eight bits of jump information on lines 232 denominated JUMP SIZE are severed from their connection to the track counter 230 and are instead provided to the interface circuit 25. Severed connections are indicated by dotted lines in FIG. 11.

In the interface circuit 25, the JUMP SIZE on lines 232 is provided to one input of a channel of a 2-to-1 digital multiplexer (MUX) circuit 233. The other input of the same multiplexer channel is connected to data bus 32 in the interface circuit 25. The select input (SEL) of the multiplexer 233 is connected to one of the output lines of a port of a peripheral interface adapter (PIA) 236. Accordingly, when it is desired to take control of the video disc player to accomplish a jump greater than the normal capability, PIA 236 selects the digital data on the data bus 32 for provision to the track counter 230.

The load (LD) signal for the track counter 230 is also intercepted and controlled in the disclosed embodiment. Normally, a signal denominated LOAD COUNTER is provided by PIO 231 in the disc player, and controls the parallel loading of the track counter 230 with the JUMP SIZE information. This connection is severed in the disclosed embodiment, and the LOAD COUNTER signal is provided to one input of a channel of a 2-to-1 multiplexer 240, which is also selected by the select (SEL) signal on line 237. The other input to the same channel is connected to one of the port lines of PIA 236 in the interface circuit 25. Accordingly, when it is desired to load the counter 230, the multiplexer 240 is conditioned to receive a loading signal from PIA 236 in the interface 25 rather than from the PIO 231 in the disc player 23.

In the disc player 23, the signals to trigger jumps are designated JUMP TRIG and MULTI-JUMP TRIG. The JUMP TRIG signal is provided from PIO 231 and indicates that a jump of one track is desired. The MULTI-JUMP TRIG is a signal which indicates that a jump of a number of tracks (as manifested by JUMP SIZE) is desired.

The JUMP TRIG signal is normally connected in the disc player circuitry to the input of a proprietary servo control circuit 242, which includes logic and amplifiers for controlling certain servomechanisms used in the video disc player. The JUMP TRIG signal normally triggers a monostable multivibrator (MMV) contained with the servo control circuit 242, which provides a pulse to the input of an amplifier which drives the coil which deflects the tracking mirror 223. In order to cause this function to occur under control of the interface circuit 25, a connection is made between the JUMP TRIG line on line 243 and one of the port output lines of PIA 236. It will be understood that a pulse placed on line 243 will cause a jump of one track under control of control computer 30.

The MULTI-JUMP TRIG signal is normally provided in the video disc player 23 to a multi-jump control circuit 245. The multi-jump control circuit 245, upon receipt of the MULTI-JUMP TRIG signal, normally operates to open the tracking mirror servo mechanism loop momentarily and to pulse or "kick" the tracking mirror to the extent of its physical movement capability, thereby deflecting the laser beam radially across the disc. As the tracks are crossed, they are detected by the optics 216, and the signal TRACK COUNT decrements the track counter once for every track jumped. When the beam approaches within eight tracks of the desired track, the tracking mirror is bracked and the servo loop is closed.

In normal operation, multi-track jumps are "blind jumps", that is, the jumps are executed immediately before the time at which the frame number information is read and decoded by the frame number decoder 220. The jump is then performed, and the circuitry is responsive to look at the frame number being provided. If an error is detected between the frame number upon which the beam has locked and the desired frame number, usually this error is within eight-ten or so tracks of the desired frame, and there is normally enough time to provide a number of JUMP TRIG signals to cause single-track jumps to the desired track.

In the disclosed embodiment, the MULTI-JUMP TRIG signal is severed from its connection to the multi-jump control circuit 245 and is instead provided to one input of a channel of multiplexer 240. The other input of the same multiplexer channel is connected to one of the output lines of PIA 236. Thus, either the MULTI-JUMP TRIG signal from PIO 231 can be selected to trigger a jump, or a similar signal can be selected from the interface circuit 25 when it is desired to make a multi-track jump of greater than the nominal maximum capability of the disc player. It will thus be appreciated that the deflection of the tracking mirror through a multi-jump command can be effectuated via the interface circuit 25.

The direction of track jumping for the disc player used in the disclosed embodiment is controlled by signal denominated SCAN C. This signal is normally provided from PIO 231 in the video disc player 23 to the multi-jump control circuit 245. In the disclosed embodiment, this connection is severed, and the SCAN C signal is provided to the one input of a channel of multiplexer 240. The other input of the same multiplexer channel is provided from one of the output lines of PIA 236. The output of the multiplexer channel is then connected to the input of the multi-jump control circuit 245 which normally received the SCAN C signal. It will thus be appreciated that the direction of jumping can be controlled by selecting either the SCAN C signal from PIO 231, or by selecting a similar signal from the PIA 236 under control of computer 30.

A final disc player modification made in the disclosed embodiment is to assist the slide servomechanism when a multiple track jump is desired. In the video disc player 23, the servo-mechanism circuitry for the slide motor is always attempting to center the beam within the field of view of the tracking mirror. Thus, in normal operation, when a jump at or near the maximum capability is performed, the tracking mirror 223 is rapidly deflected to throw the beam radially along the video disc, the beam is locked to the desired track, and the slide servomechanism moves the slide to bring the center of the field of view of the tracking mirror 223 directly over the track to which the beam is locked. Because of the mass of the slide, a large amount of time (about 150 mS) is normally stated by the manufacturer of the video disc player 23 as the time required to move and settle the slide.

In the disclosed embodiment, in order to accomplish a more rapid movement of the slide to center the mirror, and to thereby enhance the reliability and accuracy of large multi-track jumps, an "assist" pulse is provided to the slide servomechanism by the interface circuit 25, as a function of the size of the jump and the direction of the jump. This assist pulse is provided from a digital-to-analog (D/A) converter circuit 250, whose output is provided through a current-limiting resistor R1 directly to the summing junction 251 at the input of the driven-/amplifier in the servo control circuit 242, which powers the slide motor M. The digital inputs to the D/A converter 250 are received over the data bus 32 in the interface circuit 25. The signal provided from the D/A converter in the preferred embodiment is a triangular pulse based on the size and direction of the jump, the rate of the jump, and a "look-ahead" factor based on the address of the next video frame to be displayed in the present sequence. In the normal frame random-access scheme, there is no foreknowledge of the next track to be accessed. Since the central control computer 30 in the disclosed embodiment has access to the sequence of frames to be displayed, by monitoring the position of the slide with respect to the jump to be taken in order to access the next frame, it is possible to anticipate the direction in which the slide will move in order to center the beam. For example, if the beam has been deflected radially inwardly for locking to a track, and then is to immediately thereafter to be deflected outwardly to access the next track, there is no need to allow the slide servo mechanism to begin accelerating the slide radially inwardly to center the beam. Rather, the slide can be decelerated so as to prepare the slide for the next jump.

In the disclosed embodiment, the parameters of amplitude, duration and offset of the slide assist pulse are optimized in order to provide the proper amount of energy to the slide, based on the rate, direction, and size of the jump immediately subsequent to a given track. Those skilled in the art will understand that given foreknowledge of the immediately subsequent jump, both in size and direction, and the present position of the laser beam, it is possible to anticipate the movement of the slide and to provide an appropriate slide assist pulse in order to minimize unnecessary slide movement and to anticipate slide movement.

It should now be understood that the foregoing circuitry is responsive to enable the video disc player 23 to perform jumps of 175 tracks in increments of one, as opposed to the conventional configuration of jumps of a magnitude of less than one hundred tracks, in increments of ten. It has been found that the foregoing modifications enable the disclosed embodiment to accurately perform jumps of up to 175 tracks in either direction without significant errors. Since in the disclosed embodiment the sequences of video images are arranged on the video disc such that any subsequent frame is within 168 tracks of any given frame in a sequence, these modifications allow the disclosed embodiment to accurately and reliably access and retrieve the video frames from the video disc in sequence.

For jumps less than twenty tracks, it has been found that the MULTI-JUMP technique of jumping has proven unreliable, since the servo mechanism in the disc player 23 is apparently optimized for jumps of about fifty tracks. Accordingly, it has been found that it is preferable to employ the JUMP TRIG single-track jumps for jumps of less than twenty tracks.

It is believed that the principal limiting factors in multi-track jumping capability include the optics for reflecting the laser beam and for detecting reflections of the beam from the disc. For example, off-axis aberrations in the focusing lens can cause beam widening at the beam photodetector, with a resultant decrease in the signal-to-noise ratio. Accordingly, improved optics will increase the jumping capability.

Another technique employed in the disclosed embodiment for compensating for these limiting factors is to provide frame identification in the video data every field, as opposed to every other field. In conventional video discs operable with the unmodified disc player, frame identification data is provided every other video field, i.e. once every track. This corresponds to a nominal frame identification rate of 30 Hz.

Thus, with a higher frame identification rate, there is more time to make a multitrack jump, read the frame identification data, and make a corrective jump if an error has been detected. In the disclosed embodiment, there is about 30 mS allowed to make each jump and any necessary corrective jumps, which corresponds to a frame identification rate of 30 Hz and a jump rate of 15 Hz.

REFLECTION BOUNDARIES AND IMPLEMENTATION

In order to conserve storage space requirements for video images on the video disc, the preferred embodiment of the present invention restricts movement within the hypothetical multi-dimensional space to a volume which is bounded by planar boundaries, thereby defining a box or cube. In order to create the illusion of movement through an infinite apparent space, the airplane is "reflected" from the boundaries in data space so that an airplane which flies perpendicularly directly into a boundary will "bounce" off the boundary and be directed 180 degrees in data space to travel in the opposite direction. For example, and referring to FIG. 1, if after traversing the B8–B5 branch the airplane 8 travels the B5–B2 branch, and the aircraft is maintained on a generally B5–B2 heading, the airplane will bounce or "reflect" off node B2 and travel branch B2–B5 back in the direction from whence it came, with the images reproduced reversed.

In order to implement this feature, several conditions are required. Referring to FIG. 12, in the preferred embodiment each branch connecting any given node to another node includes all video frames for movement either from node A to node B, and from node B back to node A. The node A to node B branch sequence includes the frames numbered A1, A2, A3 . . . An−1, An, where n is the total number of video frames for the branch sequence in a given direction. Should the airplane travel from node A to node B, these frame numbers will be retrieved from the video disc, windowed appropriately, and displayed in this sequence.

On the other hand, if travelling from node B to node A, the branch sequence B1, B2, B3 . . . Bn−1, Bn is retrieved and displayed. Accordingly, the total branch sequence image storage for the A−B branch is $n+n=2n$. As illustrated in FIG. 12, the frames for moving from A to B are alternately interweaved with the frames for moving from B to A, and the control computer is responsive to the movement of direction to omit or ignore the inappropriate frames retrieved from the video disc. As mentioned earlier, the digital information included with each storage frame contains the frame number in a linked-list fashion, so that the computer can retrieve the appropriate frame subsequent to a given frame.

Preferably, there are also additional predetermined characteristics of the stored video image to insure that the operator will not perceive a change in direction when a boundary is encountered. For example, any approaching objects which are within the displayed area as a boundary is approached must necessarily remain in the same relative position after reflection has occurred, so that the object will continue to approach if the same heading is maintained. If mountains are visible in the distance as the boundary is approached, the same mountains must be visible in the opposite direction from the boundary.

These boundary characteristics in the preferred embodiment are included by preprocessing the video images for boundary branch sequences prior to storage. Such preprocessing involves the creation of what shall be referred to as "node to boundary" branches or sequences, which comprise sequences of video frames reproduced at a reflection boundary. In order to illustrate these concepts, reference is made to FIG. 13.

Figure 13:
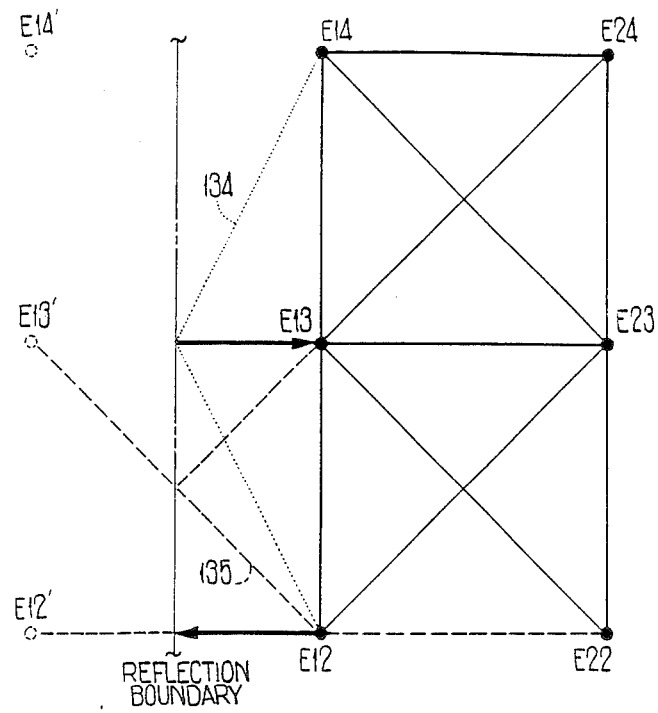
FIG. 13 illustrates the reflection boundaries of the data space of FIGS. 2 and 3.

In FIG. 13, there are illustrated several exemplary nodes and an exemplary data space boundary for the diagonally connected orthogonal data space of FIG. 2. Assume that the airplane has travelled in data space along the E22-E12 branch, and that the operator inputs at the decision point E12 have determined that the path of the airplane shall continue to the reflection boundary. There will therefore be reproduced an "E12-boundary" sequence, windowed to maintain the apparently straight heading toward the imaginary node E12'. If there are n frames in a complete branch sequence going in one direction from node to node, there will thus be reproduced n/2 frames stored for E12 to the boundary, followed by n/2 reverse-direction frames showing movement from the boundary back toward E12, with the video lines reproduced reversed. This sequence of frames creates illusion of moving from E12 to E12'.

Figure 14A:
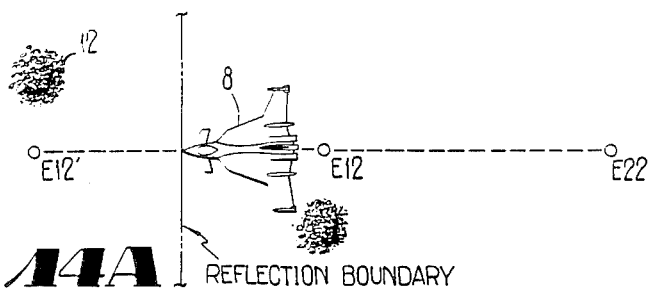
FIGS. 14A and 14B graphically illustrate some aspects of reflection boundaries in data space.
Figure 14B:
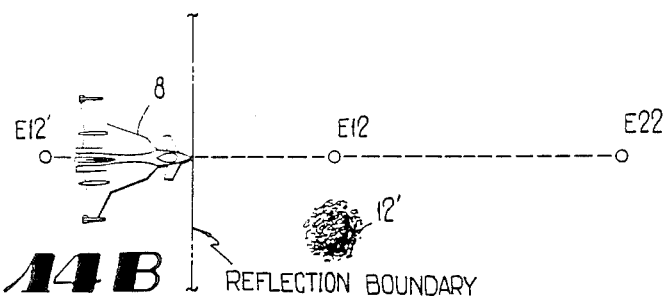

Stated somewhat differently, objects in the E12-boundary sequence appearing on the right hand side of the display must continue to be displayed on the right hand side after reflection and movement in data space from the boundary back to E12, to preserve the illusion of movement from E12 to E12'. For example, FIG. 14A illustrates the airplane 8 moving from the node E12 toward the reflection boundary, apparently heading toward the hypothetical node E12'. A tree 12 is in the right hand field of view of the airplane, and consequently is displayed. As shown in FIG. 14B, at the instant of reflection from the boundary there must be displayed an identical tree 12' which is approached after the reflection boundary has been encountered. Thus, it will be appreciated that the branch sequence E12-boundary is reproduced, followed by the branch sequence boundary-E12 consisting of the reversed images of the E12-boundary sequence, whereafter the airplane will continue movement back toward the E22 node.

Because the boundaries are "reflection" boundaries, it is as if there were a mirror positioned at the boundary which reflects the image of objects near the boundary (except the image of the airplane itself). Travel in apparent space continues as if the airplane were maintaining a constant heading, since the airplane reflects off the boundary only in data space. The "reflection" aspect of the video images of a node-boundary branch is effectuated by providing that the boundary-to-node sequence includes images representative of travel in data space back toward the node from whence the airplane came (or toward a node reachable by virtue of the angle of incidence upon the boundary), except that the images are reversed. Reversal occurs because the buffer address control 115 causes the horizontal line buffers 110, 112 to shift from FIFO to LIFO (or LIFO to FIFO) of the horizontal line at the instant of reflection.

It should be remembered here that movement in data space can occur only between adjacent nodes. For example, it is theoretically possible that if the reflection boundary provided a true mirror-like reflection, the airplane could conceivably take the path 134 in FIG. 12 from E12 to E14, "bouncing" off the reflection boundary where the angle of incidence equals the angle of reflection. This would create the illusion of movement toward the hypothetical node E14'. However, in order to simplify data storage, it is a feature in the disclosed embodiment that movement in the diagonally connected orthogonal data space can only occur along the path 135 from E12 to E13, creating the illusion of movement toward E13'. In order to effectuate reflection on path 135 and movement from node E12 to E13, the boundary branch sequence E12-E13 comprises the usual predetermined number of frames, with the first half of the frames representing movement from E12 to the boundary (with apparent movement toward E13') and the second half of the frames representing movement from the boundary to E13 (with apparent movement toward E-13). If the airplane is maintained on the same apparent heading after reflection (toward node E24), the E13-E24 branch sequence will be displayed next.

VIDEO DISC FRAME NUMBERING AND LAYOUT

As has been described above, the disclosed embodiment of the present invention is capable of accurately and reliably performing multi-track jumps of up to plus or minus 175 tracks on the video disc. In order to utilize this capability in producing a system for simulating freedom of movement by selecting and reproducing a particular one of a plurality of selectable sequences of video images, it has been discovered that a large number of video frames can be arranged on a video disc in such a fashion that given any particular frame in a sequence, the next frame in the sequence lies within a predetermined number of tracks from the given frame within the jump capability of the video disc player. The frame identification method employed in the disclosed embodiment insures that the next frame in a sequence of frames can be reached with a jump of less than plus or minus one hundred seventy-five tracks within one frame time, that is, within about 30 mS.

Figure 15:
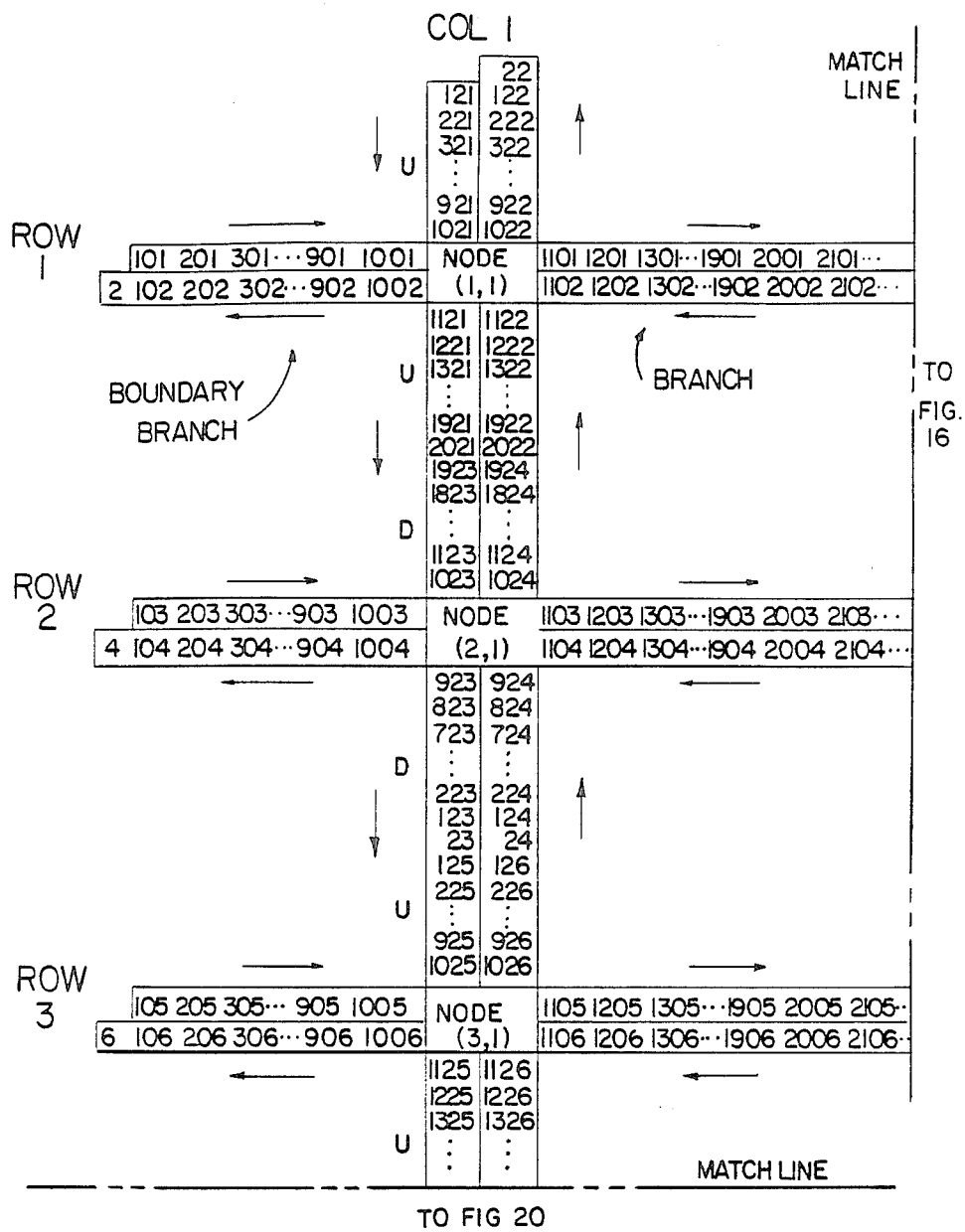

FIG. 15 illustrates an exemplary frame numbering and identification method for a typical conventional optically-readable video disc. Such a typical video disc has about 54,000 frames which are sequentially numbered from 1 for the radially outermost frame to about 54,000 for the radially innermost frame, arranged in a continuous inwardly spiraling track, with each frame represented by one revolution of the disc. In the disclosed method the numbered frames correspond to a data space wherein at any given node, the first frame of each branch extending from the given node is within plus or minus one hundred seventy-five tracks of the last frame of the branch in data space leading to a given node. In the example of FIGS. 15-24, the data space comprises a 10×10 matrix, that is, there are ten rows and ten columns of branches which intersect at one hundred nodes (for a total of forty frames for movement in both directions). Each branch connecting adjacent nodes comprises twenty frames in each direction, for a total of twenty frames for movement in each direction between the adjacent nodes. The boundary branches include ten frames in each direction, for a total of twenty frames for movement from a boundary node to the boundary, and back to the boundary node after a reflection.

After the discussion which follows, it will be understood that the frame identification method described herein for the exemplary 10×10 one-plane data space uses fewer than 20,000 frames. Many presently available video discs are able to store as many as 54,000 frames, so it is well within the present capability of the disclosed embodiment to provide for at least two parallel 10×10 matrices in a data space. It is expected that as video disc technology improves, more frames can be stored on a single video disc. After the discussion which follows, it will be understood and appreciated that the frame identification and numbering method described herein, can be successfully adapted to video discs having any number of stored frames.

It should be understood that, in the arrangement shown in FIGS. 15-24, frame numbers and track numbers are interchangeable. Thus, contiguously numbered frames are stored on physically contiguous tracks of the disc.

Referring now to FIGS. 15-24, and in particular FIG. 15, there is illustrated in a series of matching drawings an exemplary 10×10 data space with frame identifying numbers which correspond to addressable video disc locations. It will be understood that sequences of video frames corresponding to simulated movement through apparent space have been created by filming, computer graphics, or the like and stored on a master medium such as a video tape, prior to assigning frame numbers and storing the frames on a video disc. When the numbers are assigned to the frames, a frame to be reproduced subsequent to a given frame in a given sequence will not necessarily be numerically contiguous to the given frame, nor will the subsequent frame necessarily be physically contiguous on the video disc. However, the subsequent frame will be within 175 frames, and thus will be within the jumping capability of the disc player.

Frames in a given branch sequence are associated with each other by virtue of a linked list or mapping table stored in the central control computer memory. Accordingly, given any particular frame, the computer determines the next frame to be displayed by referring to the stored table or map of frames and retrieves the frame number for the frame to be displayed subsequently to the given frame.

Frame numbers in the described example are preferably assigned by first assigning frame numbers along the rows, then assigning frame numbers along the columns, and then assigning frame numbers along any diagonal branches if a diagonally connected orthogonal data space is employed.

However, it will be appreciated that other sequences of frame member assignments can be employed to minimize the likelihood of occurrence of the worst-case condition: jumping more than 175 tracks. For example, in a diagonally connected orthogonal data space such as in FIGS. 15-24, it may be preferable to prohibit sharp ninety-degree turns in data space (i.e. between orthogonal branches), in order to provide a realistic display. Thus, only dead-ahead or diagonal branches can be taken from any given branch. This allows the frames to be numbered by rows, then the diagonals, and finally the columns, so as to place the longest jumps (which are prohibited by the program for the control computer) between rows and columns.

In the figures, nodes are identified by a parenthetical number pair (x, y), wherein x represents the row number and y represents the column number. Each branch leading to a node includes two parallel groups of numbers, one group representing movement in data space toward the node and the other representing movement away from the node, as indicated by arrows.

Numbers are first assigned to the rows. Beginning at row 1, numbers are first assigned based on the jump capability of the video disc playback device. In the disclosed embodiment, the playback device has a jump capability of at least one hundred seventy-five tracks. Initially, then, numbers are assigned to the individual frames in the boundary branch leading to node (1, 1). Thus, the first numbers to be assigned are for movement toward the node (1, 1) incrementing by one hundred, that is: 101, 201, 301 . . . 901, 1001. Since there are but ten frames in a boundary branch, frame number 1001 is the last frame of the horizontal boundary branch terminating at node (1, 1).

Continuing along row one, the numbers continue to increment by one hundred. Thus, moving from the node (1, 1) to the node (1, 2) in FIG. 16, there will be assigned twenty frame numbers extending from 1101, 1201, 1301 . . . 2901, 3001. Frame 3001 is the last frame of the branch leading to node (1, 2). The numbering scheme is extended along row one through FIGS. 16, 17, 18, and 19.

Figure 19:
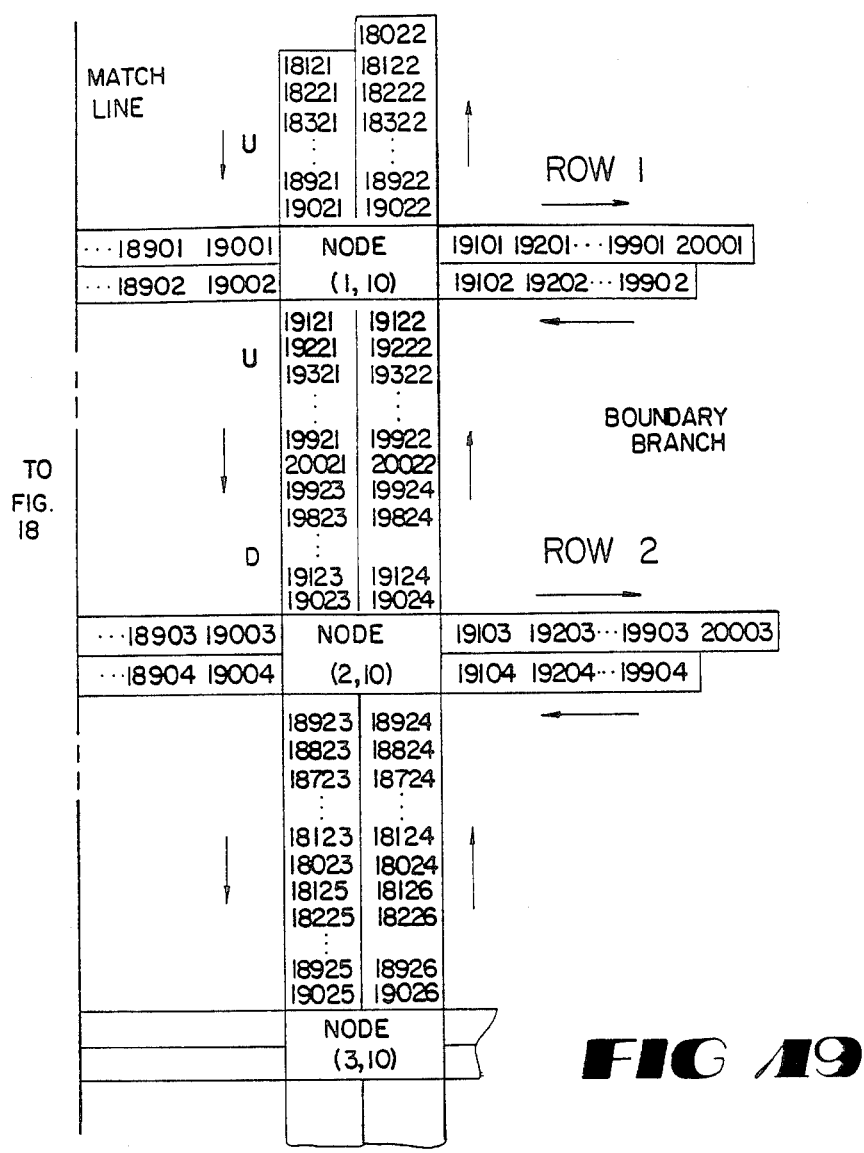

In FIG. 19, after the node (1, 10) is reached, with the boundary branch of eleven frames extending from node (1, 10) to the boundary, it will be observed that the numbers continue to be incremented by one hundred, from 19,001, 19,101, 19,201 . . . 19,901, 20,001. For row one, it will thus be observed that numbers extending up to the 20,000's have been initially appropriated in increments of one hundred.

Referring back to FIG. 15, the numbers for movement in the opposite direction from the node to the boundary are next assigned to complete row one. Observing the lower horizontal set of numbers in row one, it will be observed that the numbers differ from the upper set of numbers by one, but are also incremented by one hundred. Thus, the assignment of frames for movement from node (1, 1) to the boundary is, in reverse order: 2, 102, 202, 302 ... 902, 1002. It should be understood that the sequence in which these frames are displayed is actually in reverse order, that is 902, 802 .. . 202, 102, 2, so that the appearance of movement is from the node to the boundary.

Frame 2 represents the reflection boundary itself, and links to frame 101 to effectuate the reflection back along the odd-numbered frames of row one. It will be seen in the FIGURES that the reflection boundary frames are slightly offset.

The numbering of the frames for movement in the reverse direction continues across row one by incrementing one hundred, until as shown in FIG. 19, the final boundary branch sequence is: 19,002, 19,102, 19,202 ... 19,902.

Next in the example, the numbers are assigned to row two. Referring back to FIG. 15, since the least significant digits one and two have been assigned, for row two the least significant digits three and four are assigned, with the sequence still incrementing by one hundred. Thus, for the boundary branch to node (2, 1) the numbers are: 103, 203, 303 ... 903, 1003. Similarly, for the numbers from node (2, 1) to the boundary, the numbers are, in reverse order 4, 104, 204, ... 904, 1004. Frame 4 again is the reflection boundary.

Figure 16:
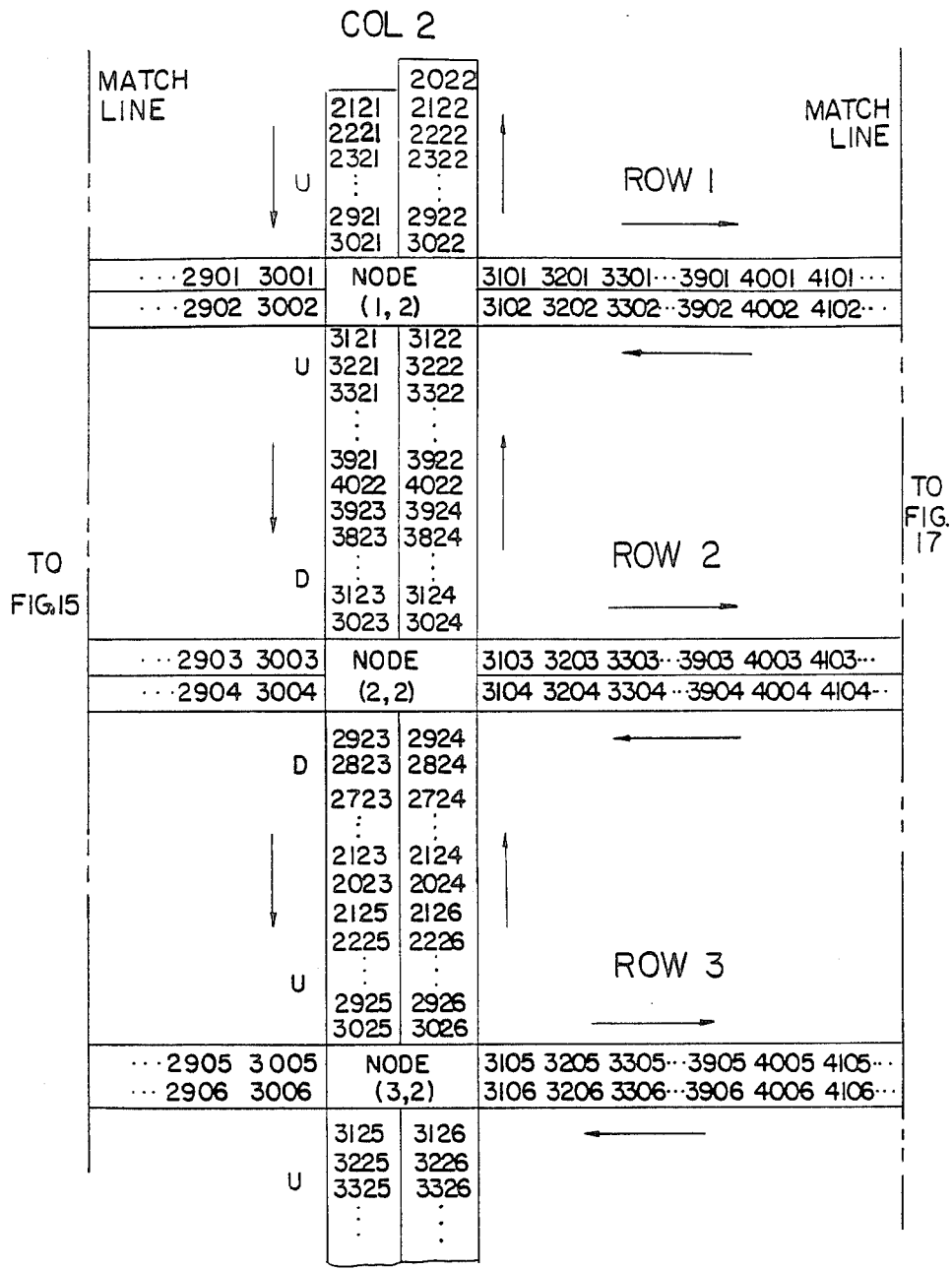
Figure 18:
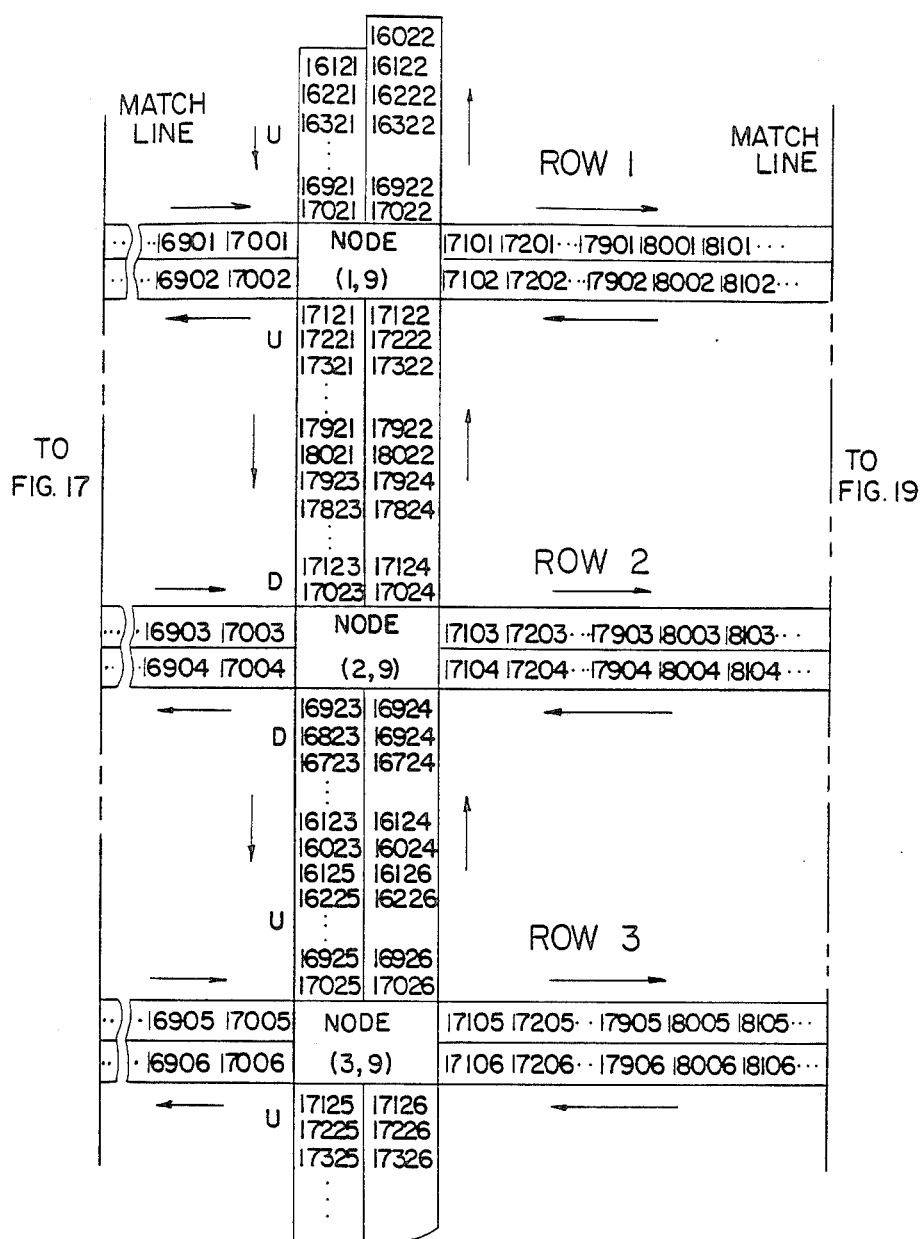

Moving from node (2, 1) in FIG. 15 to node (2, 2) in FIG. 16, the numbers are 1103, 1203, 1303 ... 2903, 3003. For movement from node (2, 2) to node (2, 1), in reverse order, the numbers are 1004, 1104, 1204 ... 2904, 3004.

Frame numbers are assigned for the remaining rows in a similar fashion, for example, in row three, the next two available least significant digits are five and six, so these least significant digits are assigned to row three, and the numbers for the branches are assigned in increments of one hundred, as can be seen in FIG. 15. Continuing to number the rows, it will thus be observed that row four uses the least significant digits seven and eight, row five uses the least significant digits nine and ten, and so forth through row ten, which uses the least significant digits nineteen and twenty.

It by now should be observed that near the nodes, the numbers near the column one nodes are in the 1000's, differing only by the least significant digits, the numbers near the nodes of column two are in the 3000's, differing only by the least significant digits, the numbers near the nodes in column three are in the 5000's, differing only by the least significant digits, etc. Finally, as seen in FIG. 19, the numbers near the nodes of column 10 are in the 19,000's.

Thus, it will be observed that for any given column, the numbers near the nodes differ only by the least significant digits, which vary in the example of FIGS. 15-24 from one through twenty. Accordingly, the next available least significant digits for assignment are is twenty-one. As described above, since the numbers near the nodes for any given column in this particular example are in odd thousands, it is an objective of numbering the frames in the columns to have the frame number for the last frame in a branch to be in the corresponding thousands for the particular column number. For example, in FIGS. 15, 20 and 21, the frame numbers in the columns adjacent to the nodes are all in the 1000's. Accordingly, it will be understood that upon reaching any given node in column one, the first frame of any branch sequence extending from node (X, 1), where X is any row number, is within 175 tracks of frame numbers from any last frame number terminating at node (X, 1).

Referring to FIG. 15, for the vertical boundary branch of column one leading to node (1, 1), the numbers at first are assigned substantially as for the rows. Beginning with the next available least significant digit of twenty-one, the frame numbers are 121, 221, 321 ... 921, 1021.

A slightly different numbering scheme is required for the branch extending between node (1, 1) and (2, 1), since it is desired to begin assigning the frame numbers in the 1000's and to also end with the frame numbers in the 1000's to satisfy the requirement that all beginning frame numbers of branches extending from a node are within 175 tracks or frames from the last frame of a branch leading to that node.

Referring still to FIG. 15, in the disclosed method, the frame numbers between node (1, 1) and node (2, 1) begin at 1121, count upwardly to 2021 in increments of one hundred, and then count downwardly in increments of one hundred after changing the least significant digit by two (in order to preserve the odd numbering for movement in the downward direction). Accordingly, the frame numbers are 1121, 1221, 1321 ... 1921, 2021, for the first ten frames. For the second ten frames, the least significant two digits are changed from twenty-one to twenty-three, and the number decrements by one hundred so that the frame numbers are: 1923, 1823 ... 1123, 1023. It will thus be seen that the last frame of the branch extending from node (1, 1) to node (2, 1) is also within 175 frames of the first frame of all branches extending from node (2, 1).

For the branch sequence from node (2, 1) to node (3, 1) the frame numbers are assigned in a similar fashion. However, since the numbering possibilities for the most significant digits have not been exhausted, the numbers continue to decrement by one hundred until the least significant digits twenty-three are reached, and then the numbers increment back to the 1000's range. Thus, the frame assignments for node (2, 1) to (3, 1) are: 923, 823, 723 ... 223, 123, 23 counting downward, then the least significant digits are increased by two to twenty-five, and the numbers are incremented by one hundred as: 125, 225 ... 925, 1025. Thus, the last frame number in the branch leading to node (3, 1) is 1025, which, as can be seen, is within 175 frames of the first frame of all branches leading from node (3, 1).

The counting up/counting down numbering assignment continues throughout the columns, as indicated by the U and D which designate counting up and counting down, respectively. As seen in FIGS. 20 and 21, the numbering of counting up and counting down to maintain the final frame number assignment for each branch in the low 1000's near the nodes continues throughout column one.

As may be observed in FIG. 21, the frame assignments for the branch extending in column one from node (9, 1) to node (10, 1) is: 1137, 1237, 1337 ... 1937, 2037 counting up and then after incrementing the least significant digit by two, counting down in increments of one hundred from: 1939, 1839 ... 1139, 1039.

For node (10, 1) to the boundary, the sequence is continued down from 939, 839 ... 239, 139, 39.

For movement in the other direction namely upwardly along column one in FIG. 21, the numbers are assigned in an identical fashion except that the least significant digits are even. Note in FIG. 21 that the last-used least significant digit was 39, while the least significant digit for movement in the opposite direction is 40.

For column two, the numbering is the same as in column one, except that the numbers near the nodes are in the 3000's, as seen in FIG. 16. And as seen in FIG. 17, the numbers near the nodes in column three are in the 5000's. The odd thousands numbering continues across the array to FIG. 19, where it may be observed that the numbers near the nodes are in the low 19,000's.

Figure 22:
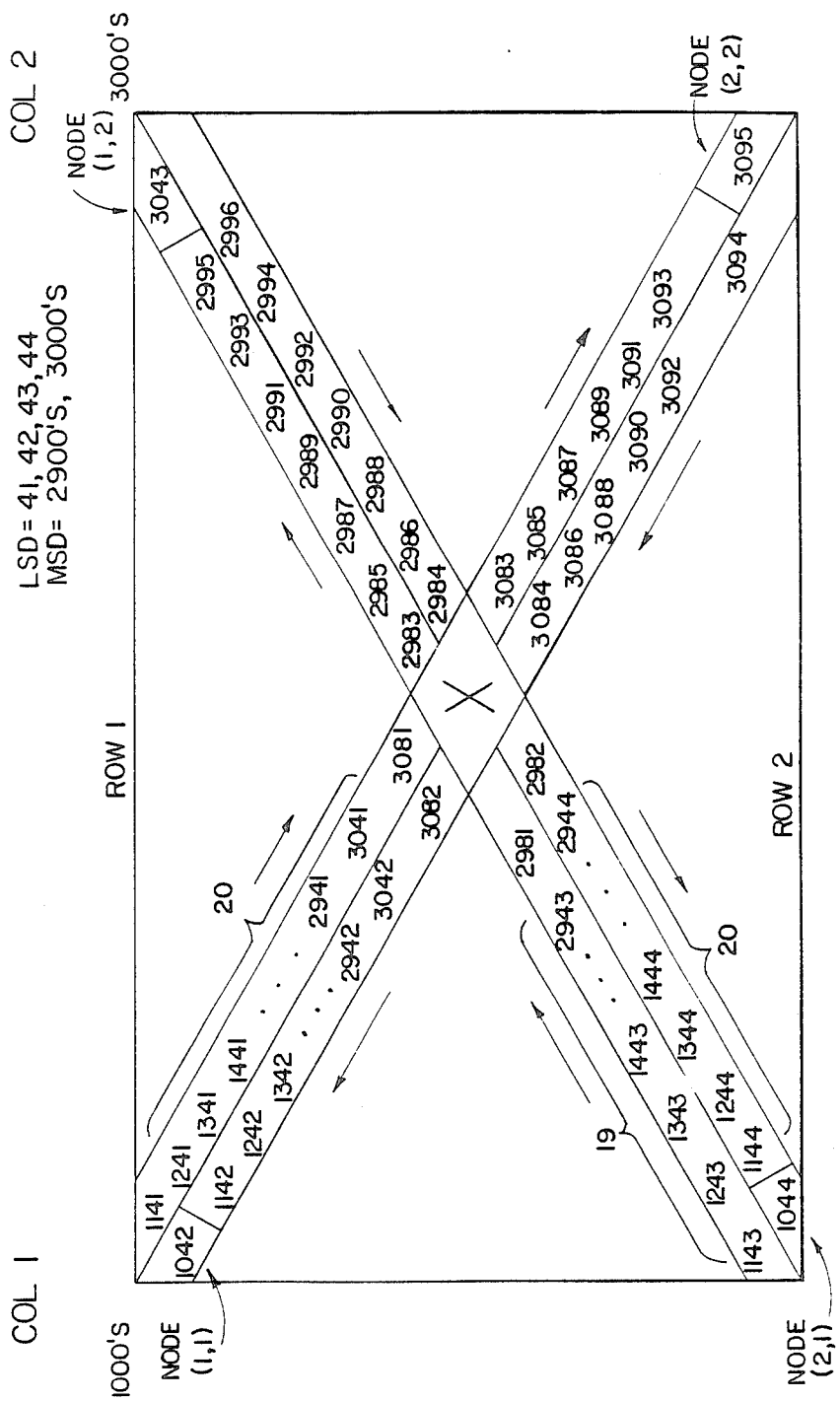
Figure 23:
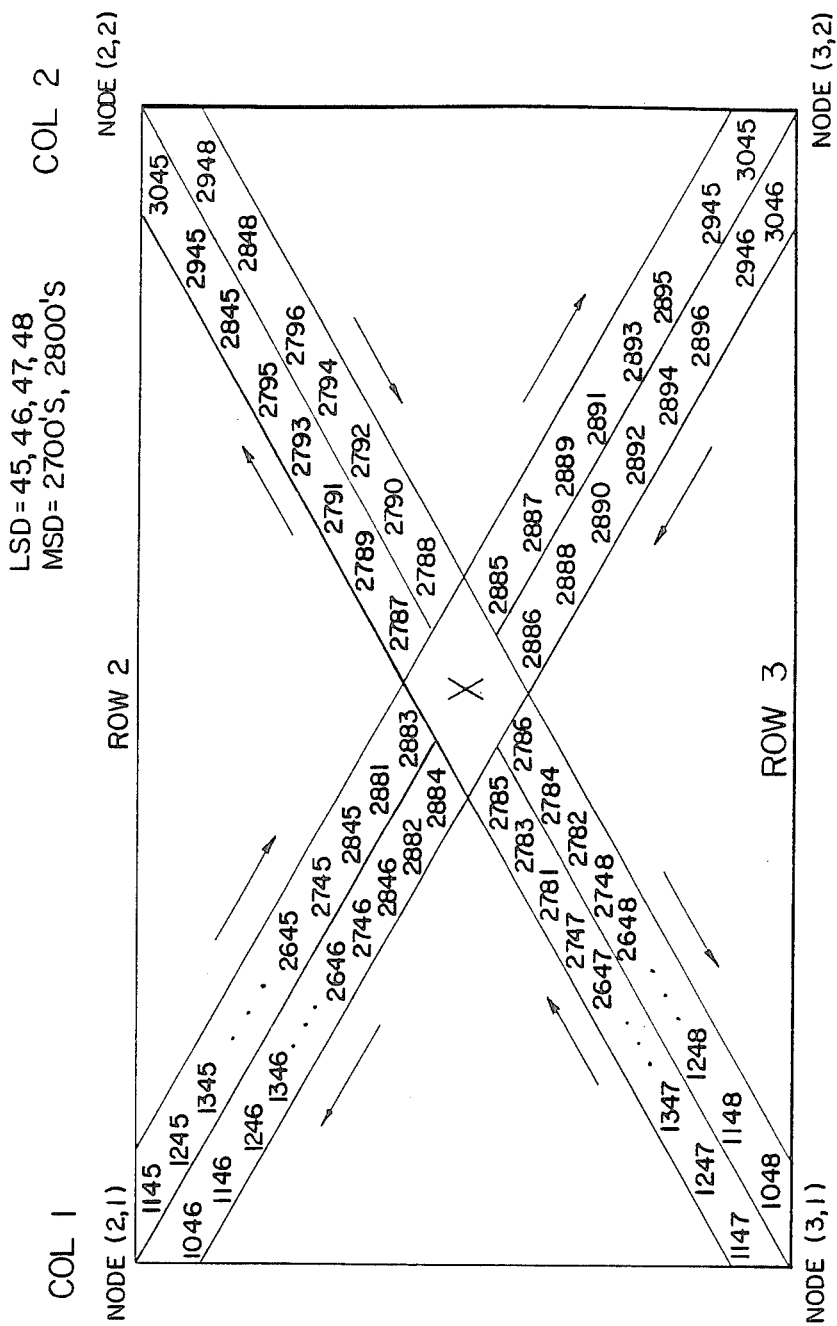
Figure 24:
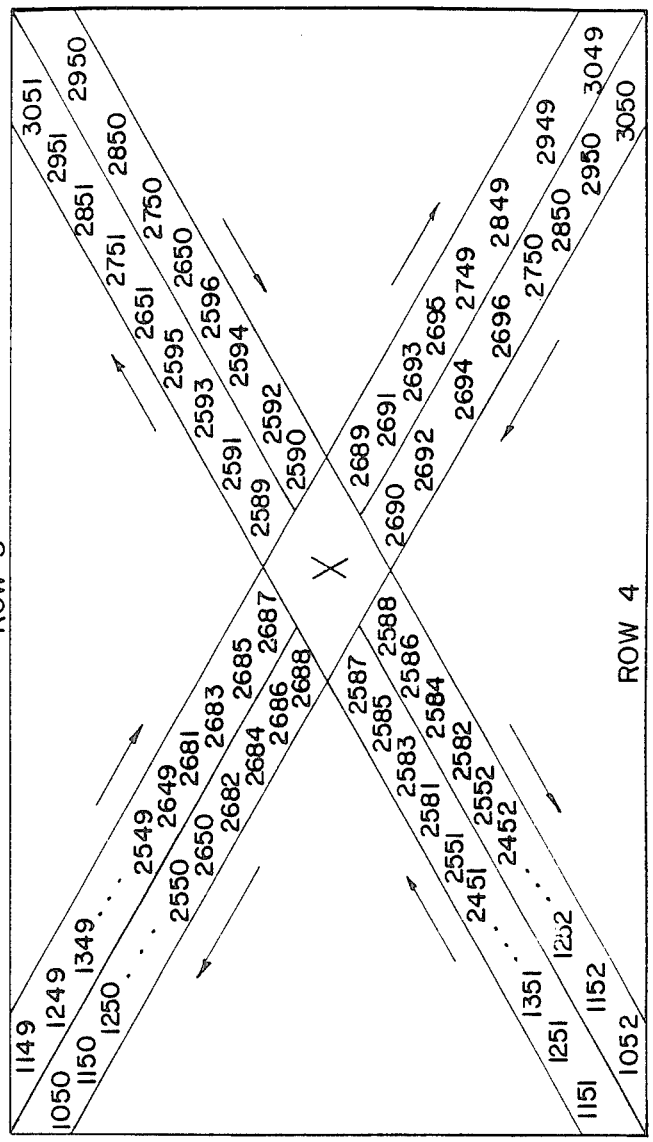

Turning now to FIGS. 22-24, there will be described the method for numbering diagonal branches in a diagonally connected orthogonal data space, if same is employed in connection with the 10×10 matrix as described above. Recalling that the last least significant two digits used in numbering the rows and columns were forty, the next available least significant two digits is forty-one. It will also be recalled that the branches between orthogonally connected nodes included twenty frames. For diagonal branches, which comprise the hypotenuse of a right triangle, the diagonal branches include greater than twenty frames. In the disclosed embodiment, each diagonal branch includes twenty-eight frames, although more or fewer than twenty-eight may be employed.

Beginning in the upper left-hand corner of FIG. 22, the diagonal branch for movement from node (1, 1) to node (2, 2) is numbered with the least significant digits of forty-one in increments in one hundred as follows: 1141, 1241, 1341 . . . 2941, 3041, for a total of twenty frames. There being eight remaining frames in the branch to be numbered, with a requirement that the final frame be numbered close to 3000 for node (2, 2), remaining numbers are assigned incrementing by two to preserve odd numbering: 3081, 3083, 3085, 3087, 3089, 3093, 3095.

A similar method is employed for the frames for movement from node (2, 2) to node (1, 1), except that the least significant digit is an even number, forty-two.

For movement from the node (2, 1) to the node (1, 2), the frames are assigned starting with the next available least significant digits forty-three and forty-four. For movement from (2, 1) toward (1, 2) assigned as follows: 1143, 1243, 1343 . . . 2943. For the additional eight frames, the numbers are: 2981, 2983, 2985, 2987, 2989, 2991, 2993, and 2995, and the final frame is 3043. For movement from node (1, 2) to (2, 1), in reverse order, the numbers are: 1044, 1144, 1244 . . . 2944. The numbers for the final eight frames are: 2982, 2984, 2986, 2988, 2990, 2992, 2994, 2996. It should be noted that the additional eight frames are in the 2900's for movement between node (2, 1) to (1, 2), and in the 3000's for movement between node (1, 1) and (2, 2). It will thus be seen that for diagonal movement from any given row in column one to the adjacent row in column two, the numbers being near 1000 and end near 3000. Accordingly, it will be understood that the same use of the least significant digits forty-one-forty four and eight-one-ninety-six are assigned for use in diagonal connections between nodes.

Referring still now to FIGS. 22 and 23, it will be seen that the system for numbering the frames in the diagonal branches proceeds generally by numbering in accordance with the row numbering method until reaching a level for "squeezing in" the eight additional frames using the least significant digits 81-96, and then continuing the basic row numbering method. With particular reference to FIG. 23, it will be seen that the branch extending from mode (2, 1) to node (3, 2) begins numbering with the next available least significant digits 45 as: 1145, 1245, 1345 . . . 2745, 2845. Since it will be recalled that the additional eight frames were placed in the 2900's and 3000's in FIG. 22, the next available thousands for fitting in the eight frames will be in the 2700's and 2800's in FIG. 23. Accordingly, when the number 2845 is reached, the eight additional frames are oddly numbered as: 2881, 2883, 2885, 2887, 2889, 2891, 2983, 2895. Then, the numbering resumes using the least significant digit of forty-five with: 2945, 3045, completing the total twenty-eight frames in the branch. For movement from node (3, 2) and node (2, 1), the same numbering scheme is employed except that the least significant digit is the even number, forty-six.

For movement from node (3, 1) to node (2, 2) in FIG. 23, the next available least significant digits are forty-seven and forty-eight, and it can be seen that the eight additional frames having the odd-numbered least significant digits 81, 83 . . . 93, 95 are in the 2700's. Likewise, for movement from node (2, 2) back to node (3, 1), the least significant digits forty-eight are employed, with the even numbered eight frames 82, 84 . . . 94, 96 also placed in the 2700's.

With reference now to FIG. 24, it may be seen that for movement along the diagonal branch from node (3, 1) to node (4, 2), the next available least significant digits 49, 50 are used, and the eight additional oddly-numbered frames 81, 83 . . . 93, 95 are in the 2600's. Movement from node (4, 2) back to node (3, 1) uses the even numbers of the eight additional frames 82, 84 . . . 94, 96, also in the 2600's.

For movement from node (4, 1) to node (3, 2), the next available least significant digits are 51, 52, and the next available thousands are the 2500's for fitting in the additional eight frames which are numbered 81-96 for movement in both directions between nodes (4, 1) and (3, 2).

It will now be understood that the numbering scheme for the diagonals is extending using the next available least significant digits after 51, 52 and the next available thousands after 2500 for numbering the remaining diagonal branches connecting columns one and two, until the final connections use the 1100's and 1200's for diagonal connections between rows nine and ten. It should be understood that the numbering method for connecting diagonals between subsequent columns is similar, in that it employs the groupings of numbers in the thousands appropriate for the given column, for example, movement between columns two and three would involve numbering between 3000's and 5000's.

It should also be understood that the foregoing numbering method leaves holes or gaps periodically in the sequence of numbers beginning at zero and extending through the total numbers available for a video disc having a predetermined number of frames, such as 54,000. In the preferred embodiment, each frame number is linked to the subsequent frame number by a map or table in computer memory, so that given any particular frame, the next frame to be displayed can be quickly found by indexing to the appropriate location in the map. Those skilled in the art will understand that certain conventional data compression techniques can be employed to locate holes or gaps in the map and to compress the frame numbering to eliminate or close the gaps, while still maintaining the basic criteria that all jumps occur between contiguous blocks of one hundred frames. Other techniques may occur to those skilled in the art for compressing the distance between adjacent frames in a given sequence. Additionally, it will be understood that the foregoing described technique for assigning frame numbers may be extended to arrays of any size, and to arrays having multiple planes, so that a multilevel data space can be created.

From the foregoing, and the frame layout arrangement shown in FIGS. 15-24, it will be appreciated that the following is a succinct description of the method of arranging frames for branches between nodes of the present invention. The arrangement is one in which each frame has a frame address (corresponding to a video disc track in the preferred embodiment) for which the last n+m digits of the address are in the form (n, m), where n represents an n digit n-tuple and m represents an m digit m-tuple, the m-tuple being the least significant digit. In this description, rows and columns are described in reference to FIGS. 15-24, but it should be understood that the significance of rows and columns may be interchanged without affecting the general nature of the method.

The method of frame arrangement on an access medium of the present invention requires reproduction apparatus characterized by an ability to jump at least k frames per buffered frame time. Since the method includes incrementing the least significant digit of the n-tuple along some branches, k clearly must be greater than $10^m$.

As used above, the buffered frame time refers to what may be considered an allowable access time for the system. Thus, the concept of buffered frame time is defined as the maximum allowable time between the last provision of video information for a given frame to an input port of a buffered output stage of the video signal path, and the time at which the input port must begin receiving video signal information from the reproduction apparatus for the next frame to be reproduced. In the preferred embodiment, the buffered frame time corresponds to a frame time. However, as was noted above, if the application for which an embodiment of the present invention is being built can accept the cost of additional buffering, the buffered frame time can be increased, thus increasing the value of k referred to above.

The method of assigning storage locations in the present invention includes selection of a first m-tuple for the first row, the m-tuple having a particular parity, and incrementing the value of the n-tuple along the row between frames. Branches for the frame sequence on the same branch, but corresponding to movement in the opposite direction, have identical n-tuples, but m-tuples which differ from the above-referenced first selected m-tuple by one. Thus, the parity of the m-tuples on a branch is odd for the frame sequence corresponding to travel along the branch in a first direction, and even for the frame sequence corresponding to travel along the same branch in the opposite direction.

The method includes the steps of continuing to assign row-wise values for the m-tuples as described above, until a maximum row value for the m-tuple is obtained on the last row of the data space.

In assigning frame addresses along the branches corresponding to columns, first a value for the first m-tuple of an address including least significant digits (n, m) is selected to be greater than the maximum value of the m-tuple referred to above used in connection with the highest numbered row. In the preferred embodiment, it is selected to be one greater than the maximum value for the m-tuple for the highest numbered row. Reference to FIGS. 15 and 21 demonstrate this. In FIG. 21, it may be seen that the highest value for the m-tuple, for row 10, equals 20. From FIG. 15 it may be seen that the first value for the m-tuple on the column branches is 21.

In assigning addresses for contiguous frames in the data space along the columns, the value of the m-tuple remains constant for a portion of the column-wise branch (preferably one-half of the frames on the branch) while the value of the n-tuple is incremented. After a predetermined position along the column branch is reached, the value of the m-tuple is increased (preferably by two to maintain parity within the branch), and the value for the n-tuple is decremented as the next node is approached.

Turning to FIG. 15 for a specific example, it can be appreciated that the column value for the n-tuple on a branch between node (1, 1) and node (1, 2) is 21, until the midpoint of the branch is reached. At the midpoint, the m-tuple is incremented by two giving a value of 23. Once the value of the m-tuple changes, the n-tuple is decremented (from 20 to 19) at the midpoint, down to a value of 10 at the last frame of the branch which is next to node (2, 1). Continuing with the branch extending down from node (2, 1), it can be seen that the n-tuple continues to be decremented to approximately the midpoint and then incremented as the sequence approaches node (3, 1). Once again, at the midpoint where the changing from decrementing to incrementing or incrementing to decrementing occurs, and the value of the m-tuple defining the frame address is increased by two.

Thus, by successively following these steps throughout the rows and columns shown in FIGS. 15-24, it will be appreciated that the values of the n-tuples for the frames on each branch adjacent to a node never differ by more than one. In going down the columns, the value for each n-tuple is returned to a value equal to, or differing by no more than one from, the n-tuple of the address of the frames contiguous to the node on the row-wise branches.

From the foregoing it will be appreciated that the numbering scheme for the assigned addresses provides an arrangement in which no frame address differs from the frame address of a frame which may have to be reproduced sequentially by a value of more than one for the n-tuples. This being the case, the value of the m+1th least significant digit never differs by more than one. From this it will be readily appreciated that the value for k described above need be no greater than ten raised to the (m+0.301030)th power. 0.301030 is the common logarithm of 1.9999 . . .

Thus, it will be appreciated that the above-described method of assigning a video disc addresses for frames on the row and column wise branches in the data space provides an arrangement in which the n-tuples for the addresses for two frames which may have to be reproduced sequentially never differ by more than one. By distributing the frames of the data space on the disc as described, the value for k (the number of frames which may be jumped per buffered access time) must be greater than $10^m$ but need be no greater than $10^{m.301}$.

Considering the foregoing description of the frame address assignment method of the present invention, and FIGS. 15-24, it will be understood that if the following constraints are met, the embodiment of the present invention will provide continuous video output from the storage medium without interruptions due to waits for disc access jumps.

Frame addresses are in the form (nm) where n represents n digits and m represents m digits, n and m being integers. k is defined as the number of frame addresses which may be skipped per buffered access time.

P is the number of frames/branch (one direction only).

R is the number of rows in the data space.

C is the number of columns in the data space.

CONSTRAINTS $m \geq \log(4R)$ $n \geq \log(P \times C)$ $k > 10^m$ but need not be greater than $10^{(m+0.301)}$ The preferred embodiment of the present invention has been disclosed by way of example and it will be understood that other modifications may occur to those skilled in the art without departing from the scope and the spirit of the appended claims.

What is claimed is:

1. Video image reproducing apparatus, comprising:
    addressable video image storage means for retrievably storing a plurality of selectable sequences of video images in addressable locations on a storage medium,
    each of said sequences including a starting image and an ending image,
    each of said video images representing a panoramic projection of a scene viewable by an operator;
    address control means for addressing said storage means and providing retrieved sequences of images;
    video image windowing means responsive to said retrieved sequences of images for providing as an output a predetermined window portion of each image of said retrieved sequences,
    said predetermined window portion comprising a portion of said video image less than the entire stored video image,
    said predetermined window portion of an ending image of a given retrieved sequence being substantially duplicative of said predetermined window portion of a starting image of a retrieved sequence immediately subsequent to said given sequence to provide a relatively imperceptible transition between sequences; and
    display means responsive to the output of said video image windowing means for providing full screen continuous video displays corresponding only to said predetermined window portion of each of said video images in sequences corresponding to each of said retrieved sequences so as to simulate continuous movement.

2. The apparatus of claim 1, wherein said display means comprises television monitor means for displaying said sequences of images.

3. The apparatus of claim 1, wherein said addressable video image storage means comprises an addressable video disc.

4. The apparatus of claim 1, further comprising operator control means for providing operator control signals indicative of operator selection of sequences, and wherein said windowing means is responsive to said operator control signals to adjust said predetermined window portion.

5. The apparatus of claim 1, wherein each of said video images comprises a single video frame having a predetermined number of horizontal lines and a predetermined number of pixels per line.

6. The apparatus of claim 5, wherein said windowing means is operative to provide as said output a second predetermined number of horizontal lines per frame fewer than said predetermined number of horizontal lines.

7. The apparatus of claim 5, wherein said windowing means is operative to provide as said output a third predetermined number of pixels per line fewer than said predetermined number of pixels per line.

8. The apparatus of claim 1, wherein each of said video images comprises a single video frame, wherein each of said video frames represents panoramic cylindrical projection of a view portrayed by said frame, and wherein said windowing means is operative to select portions of said panoramic projection as said output.

9. The apparatus of claim 8, further comprising means for preprocessing video images to create said panoramic projection prior to storage of said images on said storage medium.

10. A method for reproducing video images to simulate movement within a multidimensional imaginary space, comprising the steps of:
    storing on a storage medium a plurality of sequences of video images, each of said sequences portraying a plurality of views seen by an operator moving from a given particular one of a plurality of points within said multidimensional space to another one of said plurality of points within said multidimensional space spaced apart from said given point,
    each of said video images representing a panoramic projection of a scene viewable by the operator within said multidimensional space,
    each of said sequences including a starting image associated with said given particular point and an ending image associated with said other spaced apart point;
    retrieving from said storage medium a first one of said sequences associated with simulated movement from a first point within said multidimensional space to a second point;
    displaying as a full screen on a video display stored video image data corresponding to only a predetermined window portion of each image of said first sequence, said predetermined window portion comprising a portion of each stored video image in said first sequence less than the entire stored video image;
    adjusting the spatial relationship of said predetermined window portion with respect to each of said stored video images as a function of an operator input as said images of said first sequence are displayed so as to select different portions of said video images for display;
    selecting and retrieving from said storage medium a second one of said sequences associated with simulated movement from said second point to a third point spaced apart from said second point as a function of said operator input, for display subsequent to said first sequence; and
    displaying on said video display a predetermined window portion of each image of said second sequence, said predetermined window portion comprising a portion of each video image in said second sequence less than the entire stored video image,
    said predetermined window portion of an ending image of said first sequence being substantially duplicative of said predetermined window portion of a starting image of said second sequence to provide a relatively imperceptible transition from said first sequence to said second sequence.

11. The method of claim 10, wherein each of said plurality of points within said space is associated with a particular predetermined number of spaced apart points by the same number of unique sequences of video images, and
wherein said stored video images comprise image data such that the predetermined window portion of the ending image of any given sequence associated with a given point is substantially duplicative of said predetermined window portion of the starting image of each of said unique sequences associated with said given point.

12. The method of claim 10, wherein said storage medium employed in the storing step comprises a video disk.

13. The method of claim 10, wherein each of said plurality of points are arranged in orthogonal space so that each point adjacent to a given point is associated with said given point by a plurality of selectable second sequences of video images extending orthogonally or collinearly from a given first sequence ending at said given point.

14. The method of claim 10, wherein each of said plurality of points is arranged in diagonally connected orthogonal space so that each point adjacent to a given point is associated with said given point by a plurality of selectable second sequences of video images extending angularly at about forty five or ninety degrees or collinearly from a given first sequence ending at said given point.

15. The method of claim 10, wherein the method is employed to simulate flight within said multi-dimensional space.

16. The method of claim 10, wherein said plurality of points are arranged in horizontal planes in said multi-dimensional space of varying density so that sequences of video images in a plane having a lower density of points have more video images than sequences of video images in a plane having a higher density of points.

17. The method of claim 10, wherein said plurality of points are arranged in horizontal planes in said multi-dimensional space of varying density so that sequences of video images in a plane having a lower density of points are longer in duration than sequences of video images in a plane having a higher density of points.

18. The method of claim 10, wherein said plurality of points are arranged in horizontal planes in said multi-dimensional space of varying apparent density, and further comprising the step of reproducing video images from a sequence in a plane having a lower density of points at a lower rate of display than images from a sequence in a plane having a higher density of points, whereby the simulation of movement at a high attitude provides the simulated effect of lower apparent velocity with respect to distant objects.

19. The method of claim 10, wherein each of said video images comprises a single video frame having about 525 horizontal video lines and about 640 pixels per line.

20. The method of claim 19, wherein each of said video frames represents a panoramic cylindrical projection of a view.

21. The method of claim 19, wherein the step of displaying a predetermined window portion of each image comprises displaying a predetermined number of horizontal lines fewer than 525 and a predetermined number of pixels per line fewer than 640.

22. The method of claim 21, wherein said predetermined portion is about 240 video lines per frame.

23. The method of claim 21, wherein said predetermined window portion is about 320 pixels per line.

24. The method of claim 19, wherein the step of retrieving video image sequences from said storage medium and displaying said predetermined window portion of each image comprises:
retrieving a video frame from a video disc video line by video line;
digitizing each video line into a first predetermined number of digital samples;
storing each digital sample in a digital line buffer memory;
retrieving a second predetermined number of stored digital samples from said buffer memory, said second predetermined number being less than said first predetermined number;
converting said second predetermined number of retrieved digital samples into an analog video signal representing a single video line; and
displaying said analog video signal as a single video line.

25. The method of claim 19, wherein the step of retrieving video image sequences from said storage medium and displaying said predetermined window portion of each image comprises:
retrieving a video frame from a video disc video line by video line;
counting each video line as retrieved;
when a first predetermined line count has been reached, displaying only the lines of said video frame subsequent to said first line count; and
when a second predetermined line count has been reached, ceasing to display the lines of said video frame subsequent to said second line count.

26. The method of claim 25, further comprising the steps of:
stripping vertical synchronization pulses from each video frame as retrieved; and
recreating vertical synchronization pulses to cause vertical retrace subsequent to said second line count.

27. The method of claim 10, wherein said predetermined window portion of a plurality of images toward the end of said first sequence is substantially duplicative of said predetermined window portion of a plurality of images toward the beginning of said second sequence.

28. The method of claim 10, wherein said third point is angularly displaced to the right of said second point with respect to a line connecting said first point and said second point, and wherein an extreme rightward window portion of an ending image of said first sequence is substantially duplicative of an extreme leftward portion of a starting image of said second sequence.

29. Apparatus for reproducing video images to simulate movement within a multidimensional space, comprising:
video image storage means for retrievably storing a plurality of selectable sequences of video images on a storage medium, each of said images of each of said sequences portraying a view seen by an operator moving from a given particular one of a plurality of points within said space toward another one of said plurality of points within said space, each of said sequences including a starting image associated with said given point and an ending image associated with said other point;

means for retrieving from said storage medium a first one of said sequences associated with simulated movement from a first point within said space toward a second point spaced apart from said first point;

means responsive to said retrieving means for displaying on a video display a predetermined window portion of each image of a sequence of images on a video monitor, said predetermined window portion comprising a portion of each video image in said sequence less than the entire stored video image;

operator control means for providing operator control signals indicative of operator selection of direction of simulated movement within said multidimensional space;

means for adjusting the spatial relationship of said predetermined window portion with respect to each of said stored video images as a function of said operator control signals as said images of said first sequence are displayed so as to select different portions of said video images for display; and selection means responsive to said operator control signals for selecting a second one of said sequences associated with simulated movement from said second point to a third point spaced apart from said second point as a function of said operator control signals, for display subsequent to said first sequence, said predetermined window portion of an ending image of said first sequence being substantially duplicative of said predetermined window portion of a starting image of said second sequence to provide a relatively imperceptible transition in view from said first sequence to said selected second sequence.

30. The apparatus of claim 29, wherein said video image storage means comprises a video disc.

31. The apparatus of claim 29, wherein said apparatus comprises a flight simulator, and wherein said operator control means comprises pilot flight controls.

32. The apparatus of claim 29, wherein each of said video images comprises a single video frame having a predetermined number of horizontal video lines and a predetermined number of pixels per line.

33. The apparatus of claim 32, wherein each of said video frames represents a panoramic cylindrical projection of a view, and wherein said adjusting means adjusts said window portion to select portions of said panoramic projection.

34. The apparatus of claim 33, further comprising means for preprocessing video images to create said panoramic projection prior to storage of said images on said storage means.

35. The apparatus of claim 32, wherein said window portion displaying means is operative to display a second predetermined number of horizontal lines fewer than said predetermined number of horizontal lines, and to display a third predetermined number of pixels per line fewer than said predetermined number of pixels per line.

36. The apparatus of claim 35, wherein said second predetermined number is about 240 video lines per frame.

37. The apparatus of claim 35, wherein said third predetermined number is about 320 pixels per line.

38. The apparatus of claim 29, wherein each of said video images comprises a video frame, wherein said retrieving means retrieves a video frame from a video disc video line by video line, and wherein said displaying means comprises:

analog to digital (A/D) converter means for digitizing each video line into a first predetermined number of digital samples;

a digital line buffer memory for storing said first predetermined number of digital samples provided by said A/D converter means;

memory control means for retrieving a second predetermined number of stored digital samples from said buffer memory, said second predetermined number of samples being less than said first predetermined number; and digital to analog (D/A) converter means for converting said second predetermined number of retrieved digital samples into an analog video signal representing a single horizontal line of one of said video images of one of said sequences.

39. The apparatus of claim 38, further comprising:
horizontal synchronization pulse stripping means for removing horizontal synchronization information from each line of an input video frame; and horizontal synchronization pulse insertion means for creating and inserting horizontal synchronization pulses into said video signal to cause horizontal retrace subsequent to conversion of said second predetermined number of retrieved digital samples into said analog video signal.

40. The apparatus of claim 38, wherein said memory control means is operative to retrieve and provide said second predetermined number of stored digital samples to said D/A converter at a rate corresponding to a single horizontal video line.

41. The apparatus of claim 29, wherein said retrieving means retrieves a video frame from a video disc video line by video line, and wherein said displaying means comprises:

a counter for counting each retrieved video line;

means responsive to a first predetermined line count of said counter for displaying only the lines of said retrieved video frame subsequent to said first line count; and means responsive to a second predetermined line count of said counter for stopping the display of lines of said retrieved video frame subsequent to said second line count.

42. The apparatus of claim 41, further comprising:
vertical synchronization pulse stripping means for removing vertical synchronization information from each video frame after retrieval, and vertical synchronization pulse insertion means for creating and inserting vertical synchronization pulses to cause vertical retrace subsequent to said second line count.

43. The apparatus of claim 41, wherein the lines of said retrieved video frame prior to said first line count and subsequent to said second line count are overscanned on said video monitor.

* * * * *